United States Patent [19]

Hafner et al.

[11] Patent Number: 4,881,468
[45] Date of Patent: Nov. 21, 1989

[54] SUSPENSION CONVEYOR SYSTEM

[75] Inventors: Josef Hafner, Gröbenzell; Werner Bergmeier, Munich; Rolf Schönenberger, Landsberg; Matthias Fischer, Ismaning, all of Fed. Rep. of Germany

[73] Assignee: Veit GmbH & Co., Landsberg, Fed. Rep. of Germany

[21] Appl. No.: 13,254

[22] Filed: Feb. 10, 1987

[30] Foreign Application Priority Data

Feb. 19, 1986 [DE] Fed. Rep. of Germany ....... 3605317
Nov. 3, 1986 [DE] Fed. Rep. of Germany ....... 3637287

[51] Int. Cl.$^4$ .............................................. B61B 3/00
[52] U.S. Cl. .................................. 104/103; 105/154
[58] Field of Search ............... 104/88, 93, 96, 89, 104/91, 103, 104, 109, 130; 105/148, 150, 154

[56] References Cited

U.S. PATENT DOCUMENTS

| 1,352,969 | 9/1920 | Kalix | 104/91 |
| 2,920,581 | 1/1960 | Cook. | |
| 3,422,950 | 1/1969 | Bachmann. | |
| 3,593,665 | 7/1971 | Marty | 104/88 |
| 3,628,462 | 12/1971 | Holt | 104/88 X |
| 4,203,369 | 5/1980 | Perrott | 104/103 X |
| 4,265,181 | 5/1981 | Schreyer et al. | 104/93 X |
| 4,671,185 | 6/1987 | Anderson et al. | 104/130 |

FOREIGN PATENT DOCUMENTS 0164109 12/1985 European Pat. Off.
1940256 2/1971 Fed. Rep. of Germany.
2201323 8/1973 Fed. Rep. of Germany.

Primary Examiner—Robert B. Reeves
Assistant Examiner—Frank H. Williams, Jr.
Attorney, Agent, or Firm—Darby & Darby

[57] ABSTRACT

Described in a suspension conveyor system suitable for the use of conveyance units having two travelling rollers interconnected by an open yoke. The suspension conveyor system is universally applicable and capable of optimum adaptation to operating and space conditions in a given plant. To this purpose the system comprises changeover means selectively operable to tilt a conveyance unit to a left or right laterally suspended position or a center-suspended position to thereby permit for instance the radii of curved rail sections to be considerably shortened and particularly achieve a less complicated construction of required switches. In a preferred embodiment the switch is formed as an integral shaped member, so that the continuity of the rail circuit has not to be interrupted for guiding a conveyance unit onto selected branch rails.

66 Claims, 18 Drawing Sheets

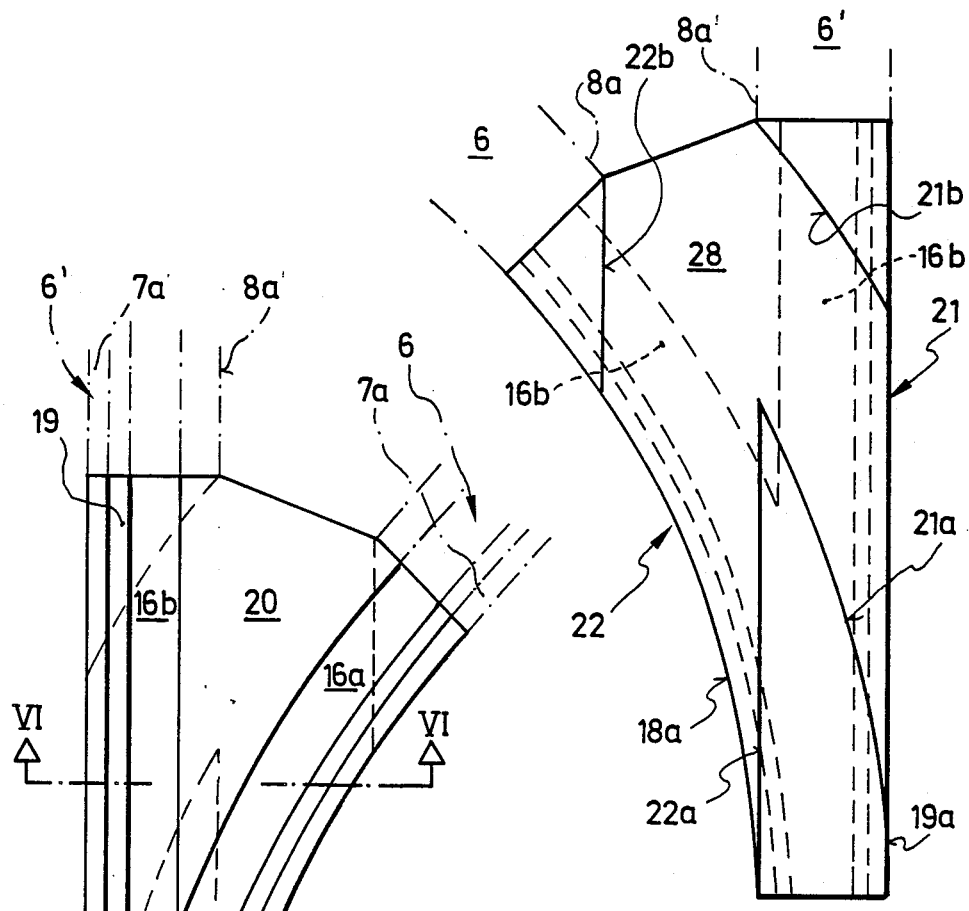
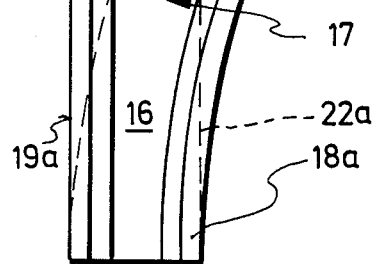
FIG.4
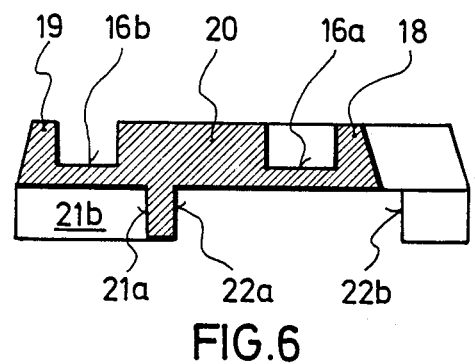
FIG.6

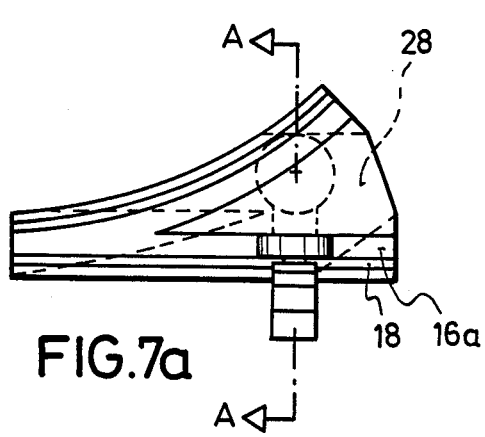
FIG.7a
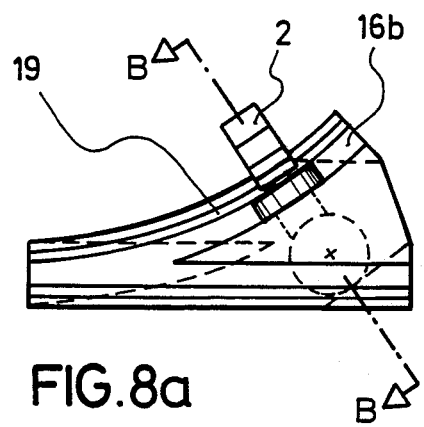
FIG.8a
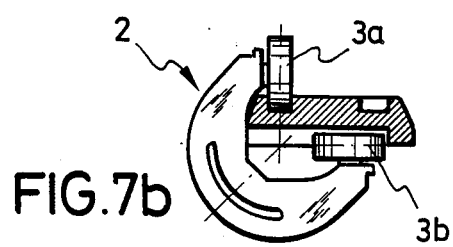
FIG.7b
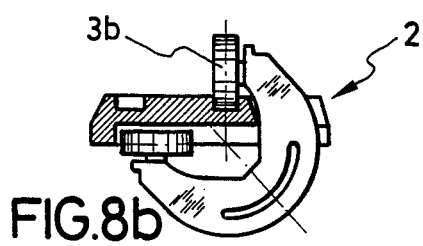
FIG.8b
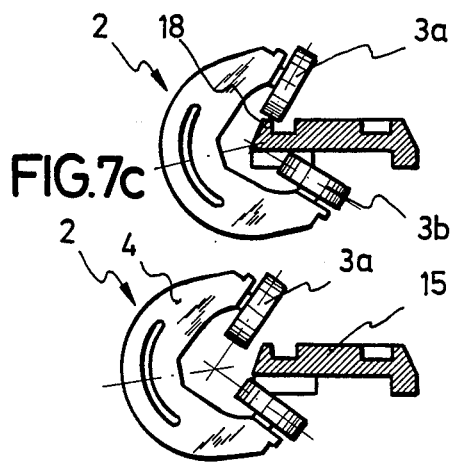
FIG.7c
FIG.7d
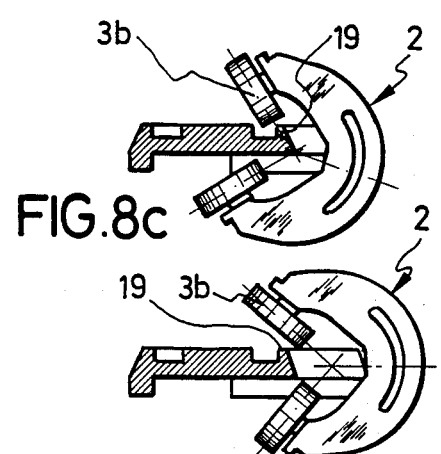
FIG.8c
FIG.8d

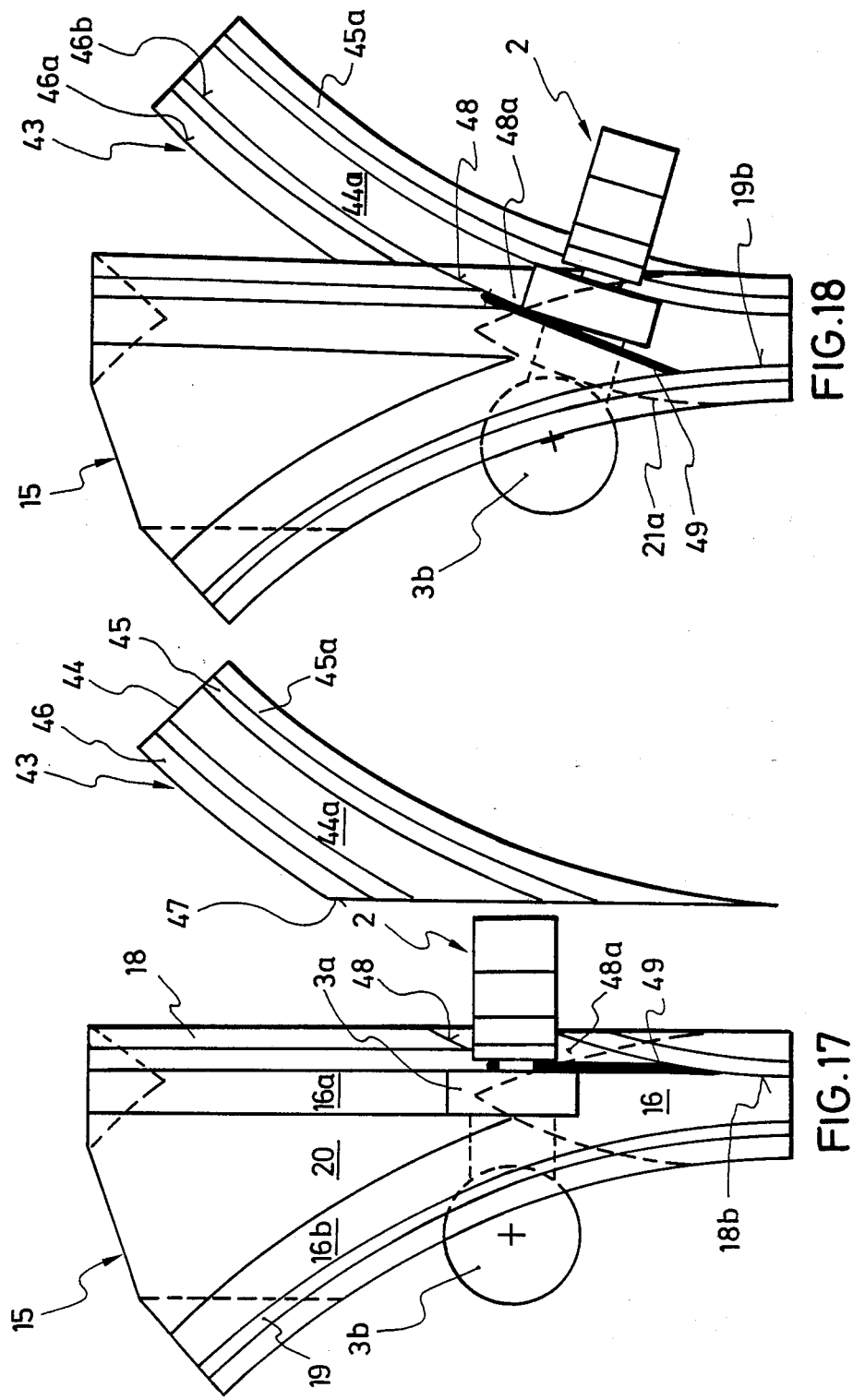

SUSPENSION CONVEYOR SYSTEM

FIELD OF THE INVENTION

The present invention relates to a suspension conveyor system of the type conveying objects along a rail path by means of a conveyance unit including first and second traveling rollers bearing the weight of the objects to be conveyed.

BACKGROUND OF THE INVENTION

Suspension conveyor systems of this type are used for the intra-plant conveyance of objects, numerous constructions of such systems being known in prior art. One such suspension conveyor system is described for instance in German Pat. No. 2,201,323. This known suspension conveyor system is equipped with rails permitting only a centrally suspended position of a conveyance unit in which both travelling rollers travel on associated travelling surfaces and cooperate with one another to carry the weight of the objects to be conveyed. This construction of a suspension conveyor system suffers from the disadvantage, however, that the rail and conveyance unit system is symmetric and thus requires the same space on both sides of the rail center line. This construction likewise results in the radius of curved rail sections to be relatively limited. This leads to certain difficulties particularly in cases in which the known suspension conveyor system is to be installed in allready existing buildings necessitating diversions around columns or struts or the passage through restricted areas. A decisive disadvantage of the previously known suspension conveyor system is also to be seen in the fact that the switches for center suspension rails are of relatively complicated construction requiring the use of movable switch points. Repeated switching operations as required for establishing and interrupting connections between rail sections result in rapid wear or misalignment of the movable parts, requiring them to be replaced or readjusted for reducing the danger that the conveyance units including the conveyed objects drop to the floor.

It is therefore an object of the present invention to improve a suspension conveyor system so as to achieve a broadened field of applications by the employ of a simple and reliable construction.

This object is attained according to the invention by the changeover means provided along the rail circuit according to the invention permits the suspension position of the conveyance unit to be changed as required. Thus a conveyance unit arriving in the centrally suspended position may be tilted to a laterally suspended position and back again, or a conveyance unit arriving in the right laterally suspended position may be caused to continue its travel in the left laterally suspended position. This permits the radius of curved rail sections to be considerably reduced, as the conveyance unit in its laterally suspended position, be it to the right or to the left, is capable of negotiating right or left bends with a considerably reduced radius without locking than would be possible in the centrally suspended position.

BRIEF DESCRIPTION OF THE DRAWING

Embodiments of the invention shall now be described in detail by way of example with reference to the accompanying drawings, wherein:

FIG. 4 shows a top plan view of a switch, FIG. 5 shows a bottom view of the switch, FIG. 6 shows a sectional view taken along the line VI—VI in FIG. 4, FIGS. 7a–d show the operation of detaching a conveyance unit at one side of the switch in three steps, FIGS. 8a–d show the operation of detaching the conveyance unit at the other side of the switch in three steps, FIG. 17 shows a three-way switch, FIG. 18 shows the three-way switch of FIG. 17 in the diverting position.

DETAILED DESCRIPTION OF PREFERRED EMBODIMENTS

Figure 1:
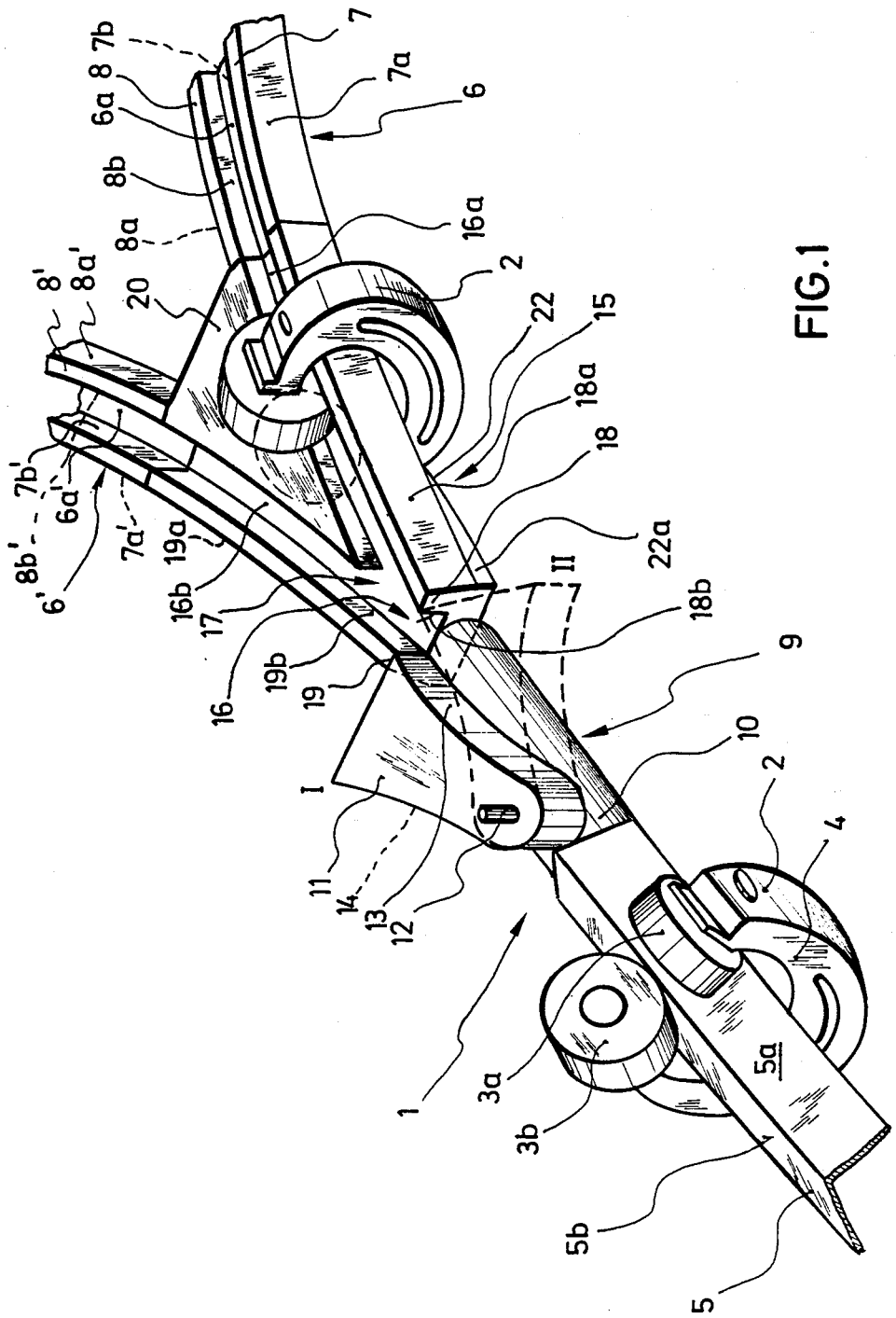
FIG. 1 shows a portion of a suspension conveyor system according to the invention.

Shown in FIG. 1 is a portion of a suspension conveyor system comprising a rail circuit 1. The suspension conveyor system further comprises conveyance units 2 running on rail circuit 1, two of which are shown in FIG. 1. Conveyance units 2 are of identical construction and comprise each a first travelling roller 3a and a second travelling roller 3b likewise of substantially identical construction. First and second travelling rollers 3a and 3b are interconnected by an open yoke 4 and adapted to travel along rail circuit 1.

The detail of rail circuit 1 shown in FIG. 1 includes a rail 5 of roof-shaped cross-sectional configuration, comprising a righthand track 5a for the travel therealong of first roller 3a, and a lefthand track 5b for the travel therealong of second roller 3b. The two tracks 5a and 5b enclose an angle of about 90° therebetween and are each inclined by an angle of about 45° with respect to the vertical. The axes of travelling rollers 3a and 3b likewise enclose an angle of about 90° therebetween, the diatance between rollers 3a and 3b at the open side of yoke 4 being smaller than the width of rail 5. Yoke 4 is disposed at a symmetrical position with respect to rail 5 and extends partially therearound from below. In this manner conveyance unit 2 travels on rail 5 in a center-suspended position M in which each travelling roller 3a, 3b supports about half the weight of an object suspended from yoke 4.

Rail circuit 1 further comprises another type of rails 6 two of which are shown in FIG. 1. Each rail 6, 6' is formed with a travelling surface or track 6a extending in a substantially horizontal plane. On their outer sides travelling surfaces or tracks 6a, 6a' are bounded by respective walls 7, 7' and 8, 8' respectively. For facilitating the storage of supplies, rails 6, 6' may be of symmetrical shape, with the respective two boundary walls 7 and 8 having the same cross-sectional shape.

When travelling on rails 6 or 6', respectively, conveyance units 2 are in a right laterally suspended position R or in a left laterally suspended position L, in which yoke 4 of conveyance unit 2 is tilted so that first travelling roller 3a or second roller 3b runs on track 6a or 6a', respectively, with the respective roller 3a or 3b carrying substantially the full weight of the object to be conveyed and yoke 4 extending partially arround the respective rail 6, 6' from the right or from the left. For preventing the weight-carrying travelling roller from being locked in the track, the outer side of boundary wall 7, 7' is formed as an engagement surface 7a, 7a' cooperating with a not shown engagement surface at the inner side of yoke 4 to be described as the description proceeds. The side of boundary wall 7, 7' facing towards track 6a, 6a' is formed with a further engagement surface 7b, 7b' cooperating with the respective travelling roller 3 for maintaining conveyance unit 2 in its respective laterally suspended position. In addition, the outer side of boundary wall 8, 8' may be formed with a running track 8a, 8a' for the respective non-weight-bearing roller 3 while the side of boundary wall 8, 8' facing towards track 6a, 6a' is formed as a second engagement surface 8b, 8b' for the weight-bearing travelling roller 3.

It this context it should be pointed out that the terms "right" and "left" in FIG. 1 and in all of the other figures are defined in the sense that the "right" side is understood to be the side lying at the right when viewing the respective figure from the left side of the sheet. In FIG. 1 first travelling roller 3a is thus the righthand roller adapted to travel on righthand rail 6 in the right laterally suspended position after yoke 4 of conveyance unit 2 has been tilted counterclockwise so as to extend partially around rail 6 from the right.

For shifting conveyance unit 2 from its center-suspended position M to its right laterally suspended position R, rail circuit 1 is provided with a changeover means 9 adjacent an end of rail 5. Changeover means 9 comprises a cylinder 10 and a positive guide element 11. As will be explained as the description proceeds, cylinder 10 is rotatably mounted, its peripheral surface being in alignment with travelling surfaces 5a and 5b of rail 5 at the level of travelling rollers 3a and 3b in the center-suspended position M. Positive guide element 11 is mounted for rotation about a pivot axis 12 located at the apex of cylinder 10 adjacent the end of rail 5. Positive guide element 11 is formed with a pair of guide surfaces 13, 14 extending substantially in the vertical direction, guide surface 13 being located on the right side of guide element 11, and guide surface 14 on the left. Adjacent rail 5 the distance between guide surfaces 13, 14 is substantially equal to or smaller than the shortest horizontal distance between travelling rollers 3a and 3b in the center-suspended position, this distance increasing in the direction away from rail 5. The increase of this distance may be linear or progressive, so that positive guide element 11 either has the flared shape as shown, or a triangular cross-sectional shape. Positive guide element 11 may also, however, be formed as a V-shaped rod bent around pivot axis 12 and having linear guide tracks.

Provided downstream of changeover means 9 is a switch 15 comprising a shaped member without any moving parts and including a substantially horizontal travelling surface or track 16 aligned with the apex of cylinder 10. At a branch location 17 of switch 15 track 16 branches into a right-hand track 16a and a lefthand track 16b aligned with travelling surfaces or tracks 6a of rail 6 and 6a' of rail 6', respectively. Track 16 is bounded by a righthand boundary wall 18 and a lefthand boundary wall 19, the two walls 18 and 19 also forming the outer boundaries of the respective associated tracks 16a and 16b. The outer sides of boundary walls 18 and 19 are formed with engagement surfaces 18a and 19a, respectively, for cooperation with yoke 4 of conveyance unit 2. Engagement surfaces 18a and 19a are aligned respectively with engagement surface 7a of rail 6 and engagement surface 7a' of rail 6'. The inner sides of boundary walls 18 and 19 are formed with respective engagement surfaces 18b and 19b for travelling rollers 3a and 3b, respectively, in alignment with engagement surfaces 7b of rail 6 and 7b' of rail 6', respectively. Extending from branch location 17 in the direction towards rails 6 is a triangular block 20 forming the inner boundary of tracks 16a and 16b in alignment with engagement surfaces 8b and 8b' of rails 6 and 6', respectively.

The side of switch 15 facing away from travelling surfaces or tracks 16a and 16b is provided with guide tracks 21 (not shown) and 22 for the respective non-weight-carrying roller, as will be described in detail. The guide track 22 shown in FIG. 1 cooperates with first travelling roller 3a in the left laterally suspended position L and is formed with a first guide surface 22a disposed in alignment with engagement surface 8a' of rail 6'.

Positive guide element 11 of changeover means 9 is pivotable to two operative positions I and II for guiding conveyance unit 2 onto a respective one of rails 6 and 6' via switch 15. In the operative position I shown in solid lines in FIG. 1, guide surface 13 substantially establishes a connection between the location whereat travelling roller 3a passes from travelling surface 5a onto cylinder 10 in the center-suspended position, and engagement surface 19b of switch 15. In this operative position, guide surface 14 extends into the path of lefthand travelling roller 3b, as shown in FIG. 1. Lefthand travelling roller 3b of a conveyance unit 2 arriving in the center-suspended position will thus come into engagement with guide surface 14. Continued advance of conveyance unit 2 will then cause it to be tilted about an imaginary tilt axis extending in the direction of travel, this tilting movement being limited by the engagement of travelling roller 3a with guide surface 13. Conveyance unit 2 will thus be tilted counterclockwise until righthand roller 3a passes onto track 16. At this instant engagement surface 18a will be engaged with yoke 4, and engagement surface 18b with travelling roller 3a so as to guide conveyance unit 2 in the right laterally suspended position onto track 6a of rail 6 via branch location 17 and track 16a.

When conveyance unit 2 is to be shifted to the left laterally suspended position, positive guide element 11 is pivoted to its operative position II shown in phantom lines in FIG. 1. The actuation of guide element 11 may be by manual operation or by means of a lever mechanism or similar conventional actuator means. In operative position II guide surface 14 is aligned with guide surface 18a of switch 15, so that guide surface 13 now projects into the path of travelling roller 3a. This causes travelling roller 3a to abut guide surface 13 to thereby tilt conveyance unit 2 to a position defined by the engagement of travelling roller 3b with guide surface 14. Yoke 4 is thus tilted in the clockwise direction until lefthand travelling roller 3b enters track 16. Upon entering track 16 yoke 4 is brought into engagement with engagement surface 19a and extends partially around track 16 from the left. At the same time travelling roller 3b comes into engagement with engagement surface 19b, so that conveyance unit 2 in its left laterally suspended position enters track 16b via branch location 17 and is from there guided onto track 6a' of rail 6'. At the same time righthand roller 3a travels over guide surface 22a onto engagement surface 8a' of rail 6'.

After this general review the individual components shall now be described in greater detail.

Figure 3:
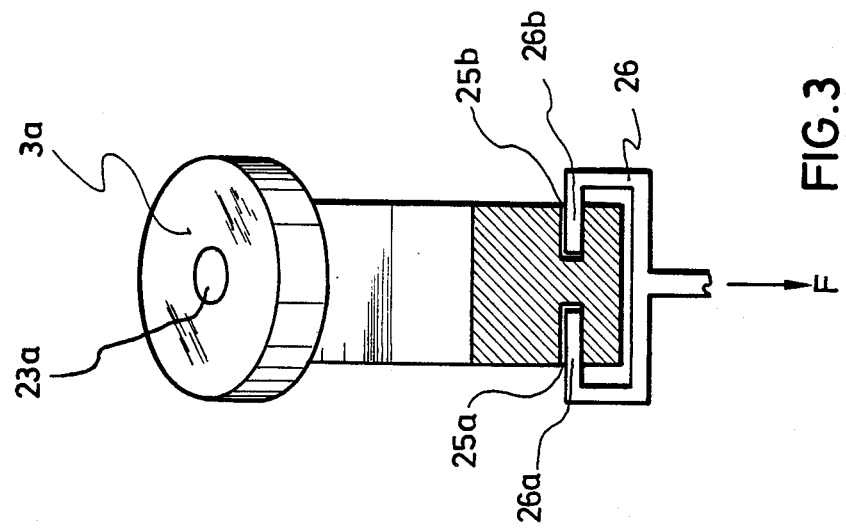
FIG. 3 shows a sectional view taken along the line III—III in FIG. 2.
Figure 2:
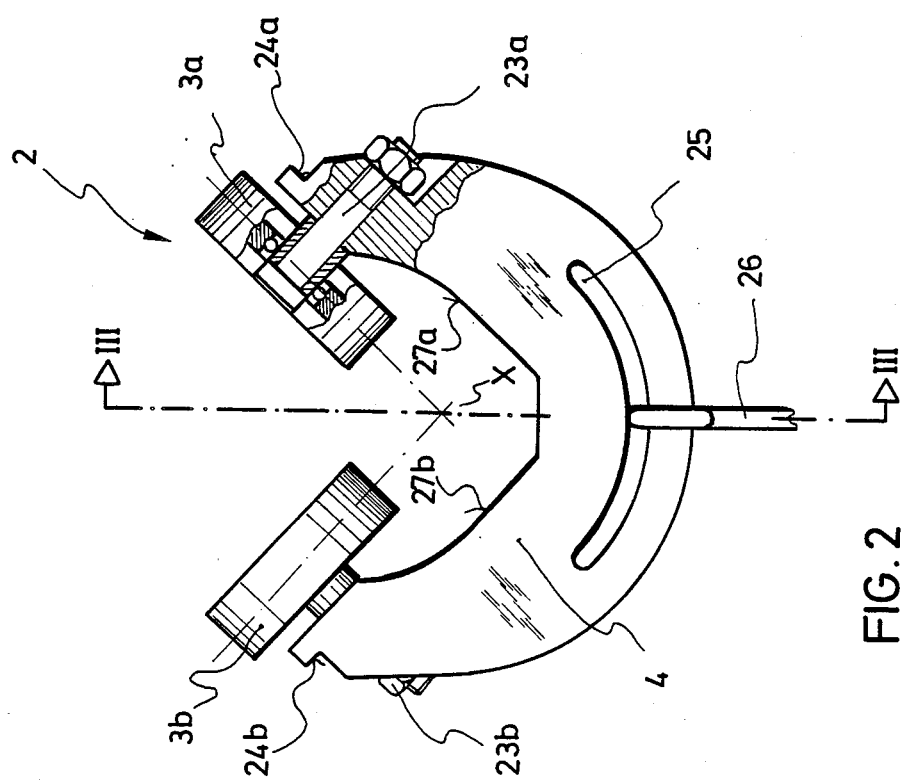
FIG. 2 shows a front view of a conveyance unit.

FIGS. 2 and 3 show details of conveyance unit 2. Yoke 4 is substantially symmetric about an axis extending halfway between travelling rollers 3a and 3b. The imaginary tilting axis X extends perpendicular to the plane of FIG. 2 at the intersection of this center axis with center-lines through the two rollers 3a and 3b. Travelling rollers 3a and 3b are rotatably mounted on yoke 4 on axes 23a and 23b, respectively, preferably with the aid of low-friction bearings. With regard to this mounting care should be taken that axes 23a and 23b do not project above the side of rollers 3a and 3b facing away from yoke 4. As already mentioned travelling rollers 3a and 3b are inclined by an angle of 90° relative to one another. It is also possible to select a different angle to correspond with the section of the center-suspension rail. Adjacent each roller 3a and 3b yoke 4 is provided with control surfaces 24a and 24b, respectively, the purpose of which is to be explained. Formed at the inner side of yoke 4 are the already mentioned engagement surfaces 27a and 27b for cooperation with engagement surfaces 18a and 19a, respectively.

Yoke 4 is further provided with a guide 25 at a symmetric position about its center axis. Guide 25 is preferably formed by a pair of slots 25a and 25b in opposite sides of yoke 4 to extend along a circular arc centered upon tilt axis X. Received in slots 25a and 25b are respective ends 26a and 26b of a C-shaped bracket 26 provided as part of an otherwise not shown suspension apparatus for the objects to be conveyed. Ends 26a and 26b are slidably guided in slots 25a and 25b, respectively. Slots 25a and 25b should extend at least over a length corresponding to the tilting angle of conveyance unit 2 from its right laterally suspended position R to its left laterally suspended position L. In the embodiment shown, this total tilting angle is about 90°, so that slots 25a and 25b should extend over an arc of at least 45° on both sides of the center axis of yoke 4 to thereby permit conveyance unit 2 to be tilted between its laterally suspended end positions without the objects suspended therefrom having to be raised or lowered in the process. This type of a guide for the suspension of the objects to be conveyed is also advantageous in the case of a conveyance unit that has not to be tilted. In this case the guide permits the objects to be conveyed to be pivoted from their perpendicularly suspended position, as for inspection purposes, without exerting any lateral force on the conveyance unit. In this manner the conveyance unit is prevented from being detached from the rail or locked thereon.

FIGS. 4 to 6 show details of switch 15. FIG. 4 shows a top plan view of switch 15 similar to the illustration of FIG. 1. The only difference of the switch shown in FIG. 4 from the one shown in FIG. 1 is that the former is a onesided switch for connection to a straight rail section 6' as shown by dash-dot lines, and an arcuate branch rail 6. In any of its embodiments switch 15 is formed as an integral shaped member not requiring any movable parts. As likewise already shown in FIG. 1, outer and inner engagement surfaces 18a, 18b and 19a, 19b, respectively, again extend over the length of tracks 16 and 16a and 16b, respectively, to merge with respective guide surfaces of rails 6 and 6'.

The bottom plan view depicted in FIG. 5 shows guide surfaces 21 and 22 for engagement by the non-weight-bearing rollers 3a and 3b, respectively, in the laterally suspended positions L and R, respectively. Guide surfaces 21 and 22 each comprise a groove-shaped recess extending parallel to the associated track 16a or 16b, respectively, and defined by two guide surfaces 21a, 21b and 22a, 22b, respectively. Guide 21 extends parallel to track 16a, with guide surfaces 21b and 21a facing towards track 16a and away from it, respectively. Guide surface 21a in particular is spaced from engagement surface 18a by a distance selected to ensure that in the right laterally suspended position R the non-weight-carrying roller 3b runs on guide surface 21a when engagement surfaces 18a and 27a are in mutual engagement. The distance between guide surfaces 21a and 21b is somewhat greater than the diameter of travelling roller 3b.

Guide surface 22a is spaced from engagement surface 19 by a distance selected to ensure that in the left laterally suspended position L travelling roller 3a runs on guide surface 22a. The distance between guide surfaces 22a and 22b is likewise somewhat greater than the diameter of roller 3a. As evident from FIG. 5, guides 21 and 22 intersect at a location 28 whereat guide surfaces 21a and 22a terminate so as to permit unhampered passage of the non-weight-bearing roller in both directions. Beyond intersection 28 guide surfaces 21a and 22a merge with engagement surfaces 8a and 8a' of rails 6 and 6', respectively. In the right laterally suspended position R travelling roller 3a thus travels along tracks 16 and 16a, while travelling roller 3b travels along guide surface 21a underneath switch 15 before passing onto engagement surface 8a downstream of switch 15. In the left laterally suspended position lefthand travelling roller 3b travels along tracks 16 and 16b, while righthand roller 3a travels along guide surface 22a underneath switch 15 before passing onto engagement surface 8a' of rail 6'.

At intersection 28 the respective non-weight-carrying roller 3a or 3b is not laterally supported at its outer side due to the termination at this point of guide surfaces 21a and 22a, permitting conveyance unit 2 to be detached from switch 15 at this location as depicted in FIGS. 7 and 8. The uppermost FIGS. 7a and 8a show top plan views of switch 15 in an embodiment which is a mirror-image of the one shown in FIG. 4. Conveyance unit 2 is positioned adjacent intersection 28 on righthand track 16a in the right laterally suspended position R, as also shown in cross-section in FIG. 7b. Conveyance unit 2 is detached as shown in FIG. 7c by tilting it beyond its right laterally suspended position R until travelling roller 3a can be lifted over boundary wall 18. In this position conveyance unit 2 can be laterally withdrawn from switch 15 as shown in FIG. 7d.

FIG. 8 shows a similar procedure for detaching conveyance unit 2 when in its left laterally suspended position by the steps depicted in FIGS. 8b to 8d.

Figures 9, 10, 11:
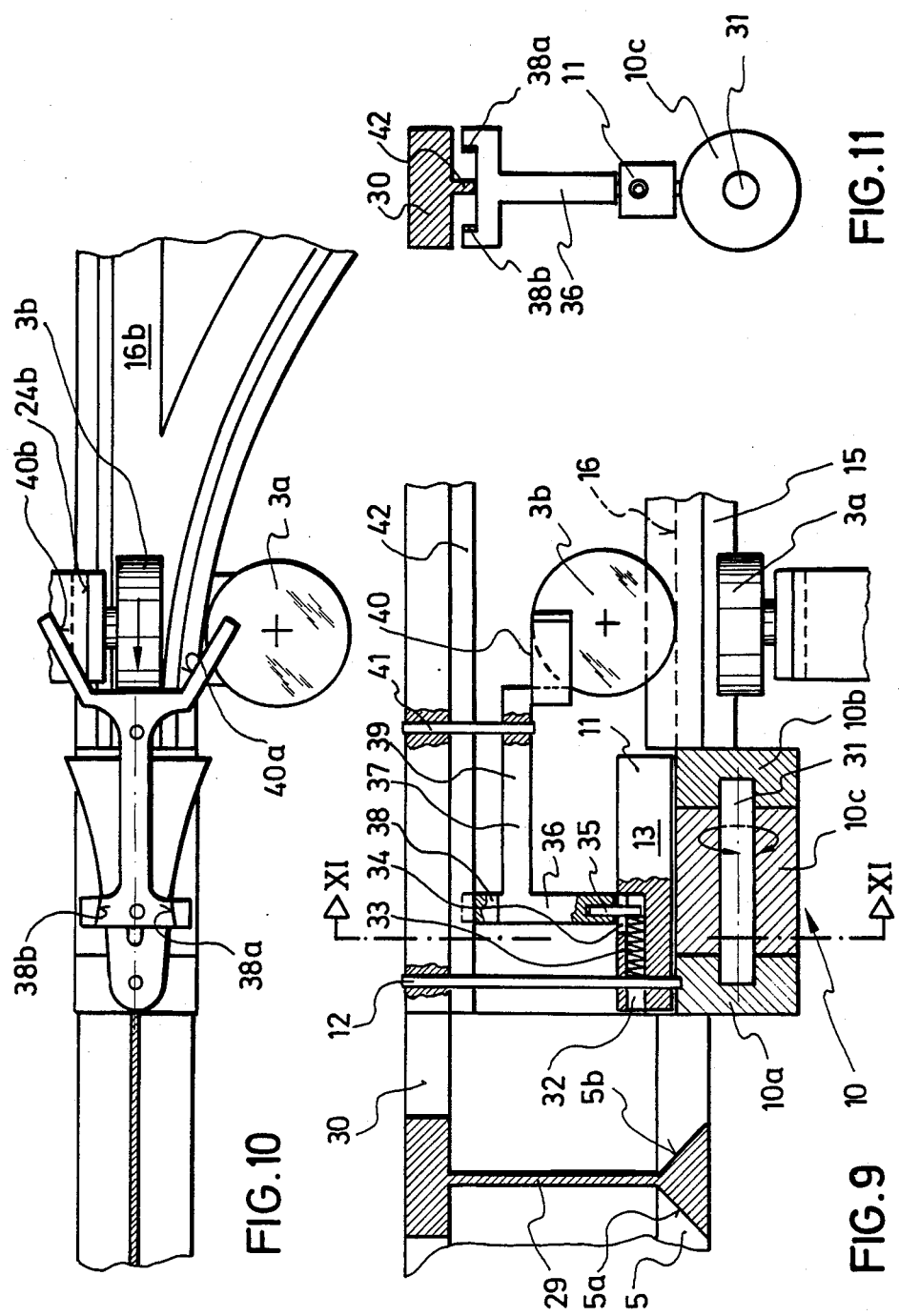
FIG. 9 shows a side elevation of a changeover means.
FIG. 10 shows a top plan view in section of a changeover means.
FIG. 11 shows a sectional view taken along the line XI—XI in FIG. 9.

FIGS. 9 to 11 show a modified embodiment of changeover means 9. FIG. 9 shows a side elevation thereof comprising cylinder 10, positive guide element 11 with guide surface 13, and pivot axis 12. Shown to the left is a rail 5 of triangular cross-section with upwards converging travelling surfaces 5a and 5b as depicted by the included cross-sectional view. As frequently encountered with rails of this type, rail 5 is integrally connected to a top flange 30 by a continuous web or separate web portions 29. The upper end of pivot axis 12 is supported in top flange 30, its lower end being supported in an end portion 10a of cylinder 10 which is non-rotatable relative to rail 5. The other end portion 10b of cylinder 10 is non-rotatable relative to switch 15. Supported in end portions 10a and 10b is a shaft 31 on which a center portion 10c of cylinder 10 is rotatably mounted.

Positive guide element 11 is formed with a blind bore 32 extending along its longitudinal center line and housing a compression spring 33. Bore 32 communicates with the top face of guide element 11 through an elongate slot 34. A pin 35 extending through slot 34 engages spring 33 so as to compress and relieve it by its movement along slot 34. The other end of pin 35 is connected to a substantially vertical leg 36 of an actuating lever 37. Actuating lever 37 comprises a forked end portion 38 extending towards top flange 30 in alignment with vertical leg 36, and a substantially horizontal leg 39 extending away from vertical leg 36 and carrying a seond fork member 40 projecting downwards from horizontal leg 39 by at least the distance between the lower end of control surface 24 on conveyance unit 2 and the upper end of the associated travelling roller 3, and extending beyond cylinder 10 to a location above track 16. Supported in horizontal leg 39 is the lower end of a second axle 41 extending parallel to axis 12 and having its upper end mounted in top flange 30 so as to permit actuating lever 37 to be rotated about axle 41. The inner sides of the forked prongs of upwards facing fork portion 38 are formed with right and left stop faces 38a and 38b, respectively, adapted on rotation of actuating lever 37 to engage a respective side of a stop bar 42 on top flange 30 for limiting the rotation of actuating lever 37 about axle 41. Stop faces 38a and 38b are suitably somewhat inclined with respect to the direction of travel, so that they can contact stop bar 42 over their full area. The horizontal fork 40 facing in the direction of travel has an inwards facing righthand control surface 40a and an inwards facing lefthand control face 40b. When changeover means 9 is in its second operative position II, righthand control face 40a projects into the path of yoke 4 in its right laterally suspended position so as to be contacted by righthand control surface 24a of yoke 4. In the first operative position I, lefthand control face 40b of fork 40 projects into the path of yoke 4 in its left laterally suspended position so as to be contacted by lefthand control surface 24b of yoke 4 to thereby pivor fork 40 and thus actuating lever 37 as a whole to the right or to the left from the position shown, or from a rightwards pivoted position to a leftwards pivoted position and vice versa, respectively, until stop face 38a or 38b, respectively, comes into engagement with stop bar 42. This rotation of actuating lever 37 is transmitted to guide element 11 by pin 35, causing guide element 11 to assume the respective operative position I or II, so that a laterally suspended conveyance unit 2 travelling in the second direction, i.e. from right to left in FIGS. 9 and 10, is enabled to automatically open a passage for itself onto rail 5.

Figure 12A:
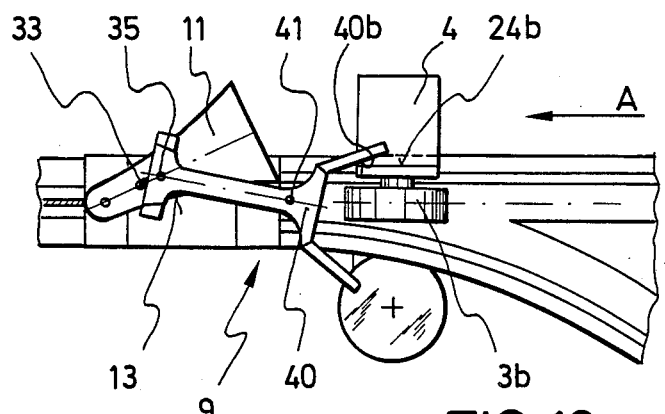
FIGS. 12a–c shows the actuation of the changeover means in a first direction by the conveyance unit in three steps.
Figure 12B:
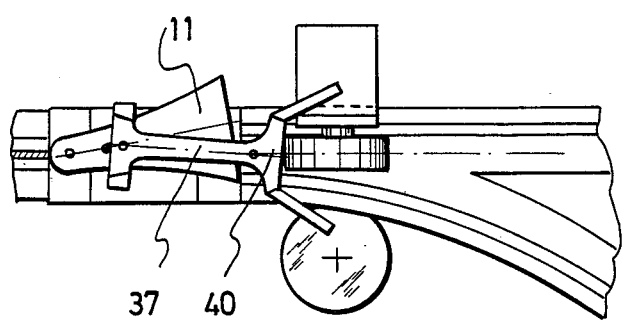
Figure 12C:
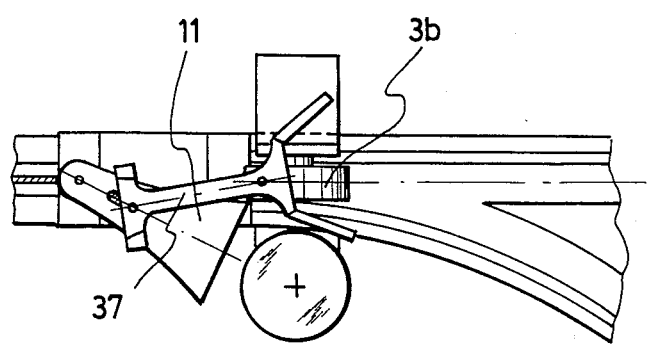
Figure 13A:
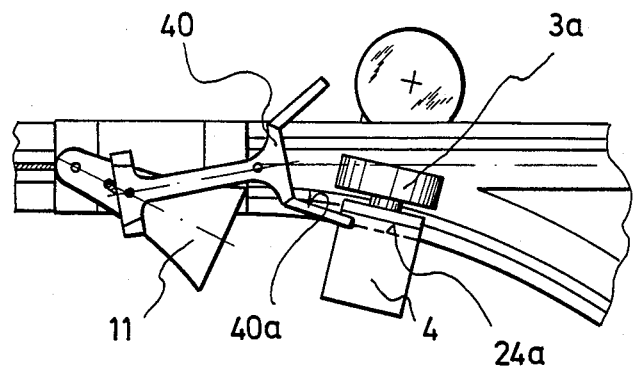
FIGS. 13a–c shows the actuation of the changeover means in a second direction by the conveyance unit in three steps.
Figure 13B:
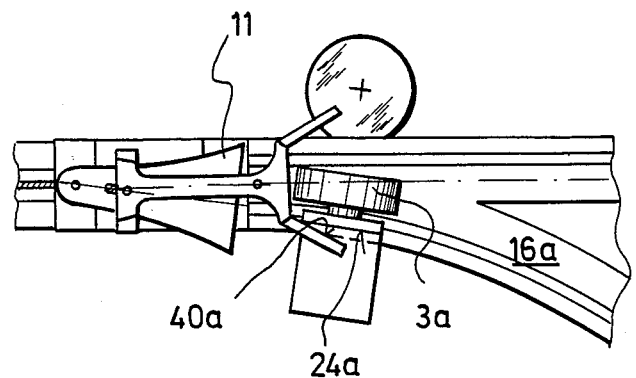
Figure 13C:
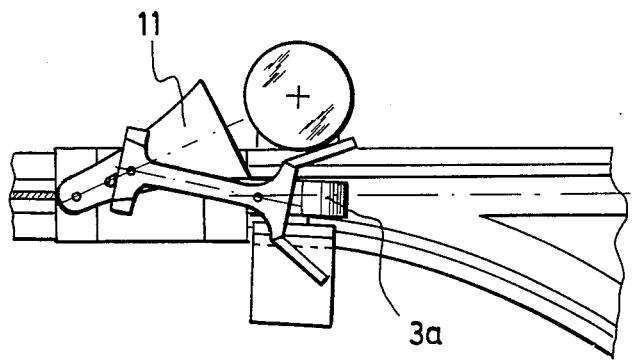

The manner in which this occurs is explained in detail with reference to FIGS. 12 and 13. FIG. 12a shows a conveyance unit 2 in the left laterally suspended position approaching fork 40 above track 16 in the direction of arrow A. Guide element 11 of changeover means 9 is in its operative position I, however, in which it permits passage of a conveyance unit 2 in the right laterally suspended position. The conveyance unit 2 approaching in its left laterally suspended position would thus strike the rear face of guide element 11 and be stopped thereby. Prior to conveyance unit 2 striking guide element 11, however, control surface 24b of yoke 4 comes into engagement with control face 40b of fork 40 to thereby rotate fork 40 to the left about axle 41, causing pin 35 to rotate guide element 11 to the right as shown in FIG. 12b. During this operation pin 35 slides in slot 34 to thereby compress spring 33. After passing a dead center position spring 33 expands again to return pin 35 to its starting position in slot 34, whereby the pivotal movement of guide element 11 to its operative position II is completed, as shown in FIG. 12c. In this position stop face 38b of fork 38 is engaged with stop bar 42, and control surface 24b of yoke 4 is released from control face 40b of fork 40, permitting conveyance unit 2 to pass underneath leg 39 of actuating lever 37 and onto cylinder 10. This results in travelling roller 3b coming into engagement with guide surface 14 to be thereby guided to the left from its left laterally suspended position, while righthand travelling roller 3a is raised from its horizontal position into engagement with guide surface 13, so that conveyance unit 2 is tilted to its center-suspended position M in this manner.

The same procedure takes place when a conveyance unit 2 approaches changeover means 9 in its right laterally suspended position with guide element 11 in its second operative position II. In this case control face 40a of fork 40 is engaged by control surface 24a of yoke 4 to thereby pivot guide element 11 back to operative position I.

The suspension conveyor system according to the invention is thus conceived as an assembly kit permitting a conveyor system outlay for meeting practically any requirement to be composed of a very small number of individual components. It is thus for instance possible to provide very short curvature radii to be negotiaetd in a laterally suspended position. Straight sections of the rail circuit may be designed for travel selectively in the center-suspended position or in any laterally suspended position as required.

Figure 14:
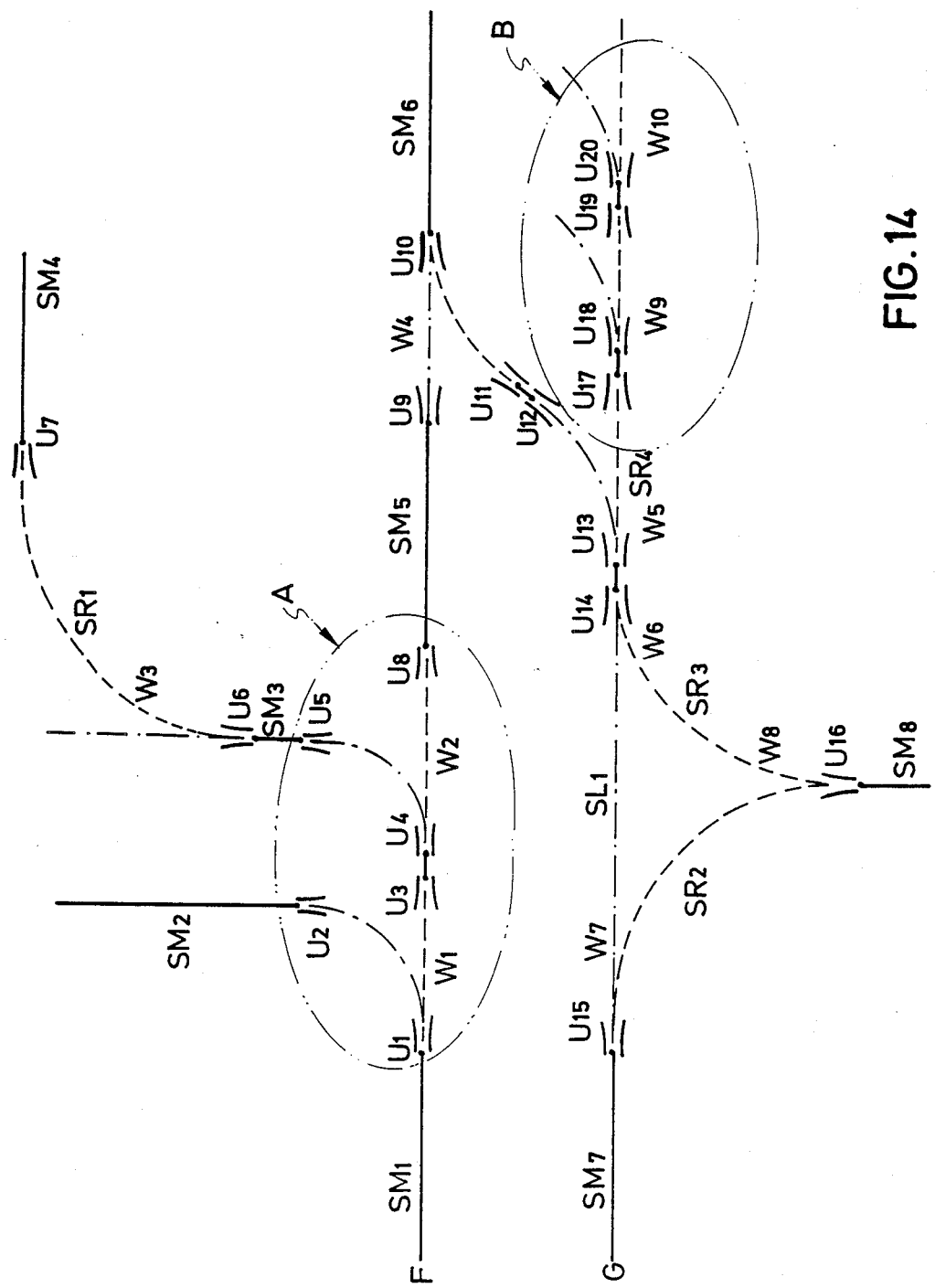
FIG. 14 shows a circuit diagram of the suspension conveyor system according to the invention.

A possible outlay of a suspension conveyor system is shown by way of example in FIG. 14. In this diagrammatical illustration, solid lines designate rail sections for the center-suspended position M, dash lines designate rail sections for the right laterally suspended position R, and dash-dot lines designate rail sections for the left laterally suspended position L.

The uppermost branch circuit F starts with a rail section SM1 for the center-suspended position, which may have the roof-shaped or triangular cross-sectional shape as shown in the previous figures. Disposed at the end of rail SM1 is a first changeover means U1, which may be of the type shown in FIGS. 9 to 11, comprising an actuating lever for automatic switching. Changeover means U1 is operable to guide the conveyance unit into a switch W1 selectively in the right or left laterally suspended position. A conveyance unit passing through switch W1 in the left laterally suspended position approaches a second changeover means U2 disposed in the rail circuit in an inverted position with respect to the direction of travel. Changeover means U2 is in a position causing the conveyance unit arriving in its left laterally suspended position to be guided onto rail SM2 in the center-suspended position. Changeover means U2 may be maintained at a fixed position, because the conveyance unit passing therethrough in any direction of travel will always have to be tilted between the two predetermined positions.

A conveyance unit passing switch W1 in the right laterally suspended position approaches a combination of two changeover means U3 and U4. Changeover unit U3 is disposed in the rail circuit in the same manner as changeover unit U2 and maintained at a fixed position to tilt the conveyance unit approaching in its right laterally suspended position back to its center-suspended position. In this position, the conveyance unit approaches changeover unit U4 which is of the same construction as changeover means U1, comprising the actuating lever for switching it between operative positions I and II. In operative position II of changeover unit U4 the conveyance unit is guided into a switch W2 in the left laterally suspended position. Disposed at the exit of switch W2 is a changeover means U5 in the same manner as changeover means U2, i.e. not provided with an actuating lever and fixed at a position causing the conveyance unit approaching in the left laterally suspended position to be guided onto a rail SM3 in the center-suspended position. Rail SM3 leads to a changeover means U6 for guiding the conveyance unit into a swithc W3 in the same manner as changeover means U1. The left branch of switch W3 may then be directly connected to a rail SR1 for the right laterally suspended position. Rail SR1 leads to a further changeover means U7 maintained at a fixed operative position for guiding the conveyance unit arriving in the right laterally suspended position onto a rail SM4 in the center-suspended position.

When changeover means U4 is in operative position I, the conveyance unit is guided through switch W2 in the right laterally suspended position. Disposed at the exit of switch W2 is a changeover means U8 analogous to U7 and secured at a fixed position in which the conveyance unit approaching in the right laterally suspended position is passed onto a rail SM5 in the center-suspended position. At the end of rail SM5 there is a changeover means U9 secured in a position effective to tilt the conveyance unit from the center-suspended position to the left laterally suspended position before entering a switch W4. Provided at the exit of switch W4 is a shiftable changeover means U10 effective to pass the conveyance unit on to a rail SM6 in the center-suspended position. On return of the conveyance unit from rail SM6 through changeover means U10 in the second operative position II thereof, the conveyance unit is tilted to its right laterally suspended position for passage through W4. At the respective exit of switch W4 there is a further combination of changeover means U11 and U12 disposed in opposite orientation and secured in respective fixed positions, in which changeover means U11 tilts the conveyance unit approaching in the right laterally suspended position to the center-suspended position to be tilted further to the left laterally suspended position by changeover means U12. In this position the conveyance unit then enters a switch W5 in the second branch G of the rail circuit. After passing through switch W5 the conveyance unit approaches another combination of two changeover means U13 and U14 mounted in opposite orientation and each adapted to be shifted to two operative positions with the aid of respective actuating levers. The conveyance unit approaching from switch W5 in the left laterally suspended position is tilted to the center-suspended position by changeover means U13 and guided into a switch W6 for instance in the left laterally suspended position. Connected to the exit of switch W6 is a rail SL1 on which the conveyance unit travels towards a switch W7. Provided at the exit of switch W7 is a changeover means U15 of the same construction and arrangement as changeover means U1. Changeover unit U15 is effective to tilt the conveyance unit arriving in the left laterally suspended position to the center-suspended position for further travel on a rail SM7. For forward travel along circuit branch G changeover means U15 may for instance be shifted to its first operative position I, so that the conveyance unit approaching on rail SM7 in the center-suspended position is tilted to the right laterally suspended position and guided through switch W7 onto a rail SR2. At the end of rail SR2 the conveyance unit enters a switch W8 and is subsequently tilted back to the center-suspended position by a succeeding changeover means U16 for travel on a rail SM8. For travel of the conveyance unit in the opposite direction from rail SM8 through changeover means U16 the latter may be shifted to its other operative position to thereby guide the conveyance unit onto a rail SR3 in the right laterally suspended position. At the end of rail SR3 the conveyance unit again enters switch W6. Changeover means U14 and U13 may then be shifted to their respective other operative positions, so that the conveyance unit passing through switch W6 in the right laterally suspended position is tilted to the center-suspended position by changeover means U14 and back to the right laterally suspended position for travel on a rail SR4 leading to a combination of changeover means U17 and U18 of the same construction and arrangement as the combination U3 and U4. After leaving changeover means U18 in the right laterally suspended position the conveyance unit passes through a switch W9 to approach a further combination of changeover means U19 and U20 of the same construction and arrangement as the combinations U3, U4 and U17, U18. The exit of U20 is connected to a further switch W10.

Figure 15:
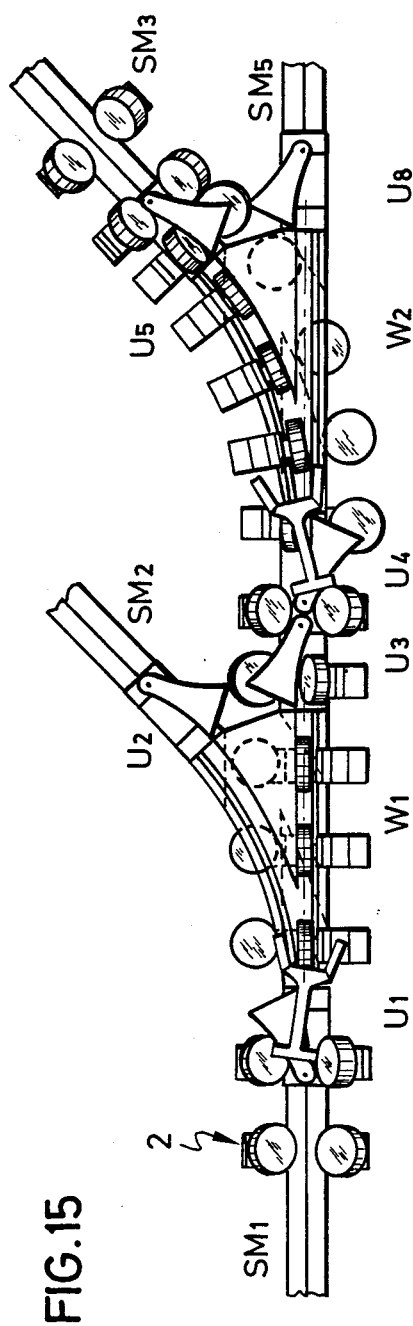
FIG. 15 shows a detail designated A in FIG. 14.
Figure 16:
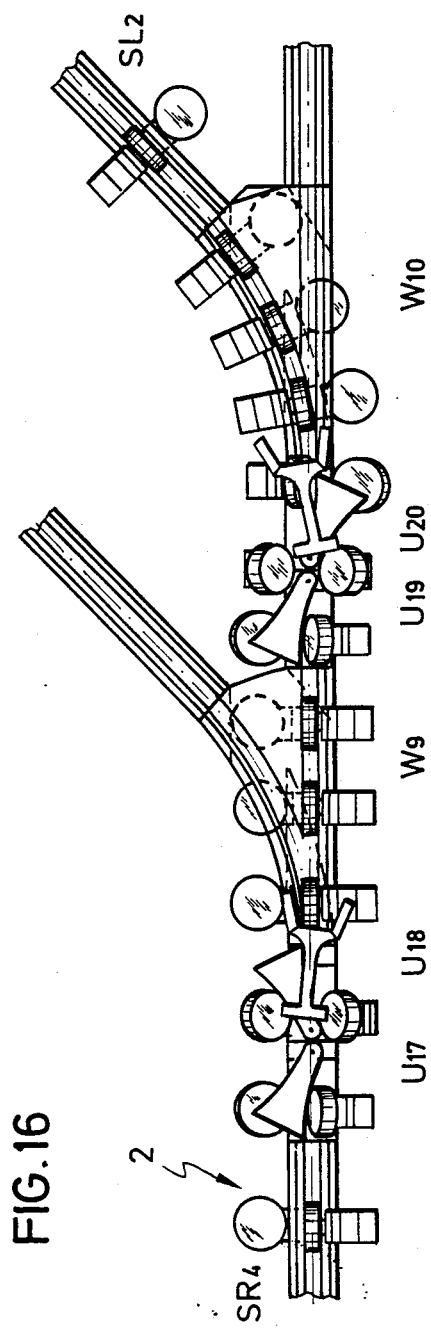
FIG. 16 shows a detail designated B in FIG. 14.

For better understanding the encircled areas designated A and B in FIG. 14 are shown in FIGS. 15 and 16, respectively for illustrating the passage of a conveyance unit through the respective circuit portions.

In FIG. 15 the conveyance unit arrives on rail SM1 in the center-suspended position, passes through changeover means U1, which is in its operative position I, and is guided into switch W1 in the right laterally suspended position. Disposed at the exit of switch W1 is the combination of changeover means U3 and U4. Changeover means U3 is disposed at a 180° offset with respect to changeover means U1 and fixed in a position in which the conveyance unit entering in the right laterally suspended position is tilted to its center-suspended position, in which it enters changeover means U4 which has been shifted to its operative position II. As a result, the conveyance unit is tilted from its center-suspended position to its left laterally suspended position to enter switch W2 in this position. Disposed at the exit of switch W2 is changeover means U5 in the fixed operative position as shown. Changeover means U5 is effective to tilt the conveyance unit arriving in the left laterally suspended position back to the center-suspended position for further travel on rail SM3.

FIG. 16 shows the detail designated B in FIG. 14. The conveyance unit arrives here on rail SR4 in the right laterally suspended position and enters changeover means U17 which is in a fixed operative position as shown, so that the conveyance unit is tilted from its right laterally suspended position to its center-suspended position before entering changeover means U18 which may selectively be in its operative position I or II. In the operative position I shown, the conveyance unit is tilted back to its right laterally suspended position for passage through switch W9. Disposed at the exit of switch W9 is the second combination of changeover means U19 and U20, of which changeover means U19 is of the same construction and arrangement as changeover means U17, so that the conveyance unit is tilted from its right laterally suspended position to the center-suspended position. Changeover means U20 is in its operative position II, so that the conveyance unit is tilted to its left laterally suspended position for passing through switch W10 and onto rail SL2.

From FIGS. 14 to 16 it is thus evident that the suspension conveyor system according to the invention is capable of being specifically adapted to practically any given requirements by the use of a relatively small number of different components. There are thus basically only three types of switches, namely right- and lefthand branching switches such as W1 and W7, and symmetric switches such as W8. All of these switches may be formed as compact integral bodies, for instance of a plastic material, with no movable load-carrying parts being required. The switches employed in the suspension conveyor system according to the invention may also be combined in a simple manner with conventional switches to thereby obtain for instance a three-way switch.

Such a combination of a conventional switch 43 with the integrally formed switch 15 according to the invention is shown by way of example in FIGS. 17 and 18. The switch 15 shown is designed as a branch-off switch comprising a linear track 16a aligned with track 16 for travel of conveyance unit 2 in the right laterally suspended position, and a track 16b for travel of conveyance unit 2 in the left laterally suspended position. The additional switch 43 comprises a rail section 44 formed with a track 44a. The cross-sectional shape of rail section 44 suitably corresponds to that of rail 6, i.e. track 44a is enclosed between boundary walls 45 and 46 provided with engagement surfaces 45a, 45b and 46a, 46b, respectively, similar to the ones already described. Rail section 44 terminates in an abutment face 47 adapted to engage the outer surface of boundary wall 18 of switch 15. The angle at which abutment face 47 is oriented with respect to track 44a determines the angle of deviation of additional switch 43.

Boundary wall 18 of switch 15 has a gap 48 formed with a track section 48a as an extension of track 16. The orientation of track section 48a corresponds to that of track 44a in the activated position of switch 43. Hingedly connected to boundary wall portion 18a is a closure member in the form of a pivotable flap 49.

In the state depicted in FIG. 17, additional switch 43 is retracted, and flap 49 is pivoted to a position in which it closes gap 48 and forms a continuous engagement surface 18a from track 16 onto track 16a. In this state switch 15 operates as described before.

In FIG. 18 additional switch 43 has been brought into abutment, and flap 49 is in a position in which it exposes gap 48 and forms a connection between surface 19b of boundary wall 19 and surface 46b of boundary wall 46. In this state of switch 43 a conveyance unit 2 arriving in its right laterally suspended position is guided onto track 44a via track portion 48a. This however requires guide surface 21a to be inclined at an angle permitting it to guide travelling roller 3b onto engagement surface 46a of rail section 44. Additional switch 43 is brought into abutment and retracted by means of known switch actuating devices. The pivoting of flap 49 may be carried out manually or by means of other actuators. Preferably, however, flap 49 is actuated by the displacements of the additional switch 43 itself with the aid of suitable transmission means.

It is also possible to assemble a switch of simple rail sections by removing respective portions of the abutting boundary walls to result in at least a branch junction with two diverging tracks. For the use of an additional switch it is also possible to form the gap portion of the boundary wall of a resilient material or in any other suitable manner permitting it to be depressed or pushed downwards by a suitable camming element provided on the additional switch when the latter is brought into abutment.

As evident from FIGS. 14 to 16, the invention basically requires the use of only a single type of changeover means as shown in FIGS. 9 to 11, which may be located in the rail circuit and selectively adjusted so as to achieve any tilt movements of the conveyance units. In the case of changeover means having a fixed operative position for tilting the conveyance units in a predetermined direction it is preferred, however, to employ a simplified type of the changeover means consisting merely of the cylinder and the positive guide element. The employ of a non-rotatable cylinder or a cylinder having non-rotatable ends permits the positive guide element to be locked on the cylinder in the desired position.

Figure 19:
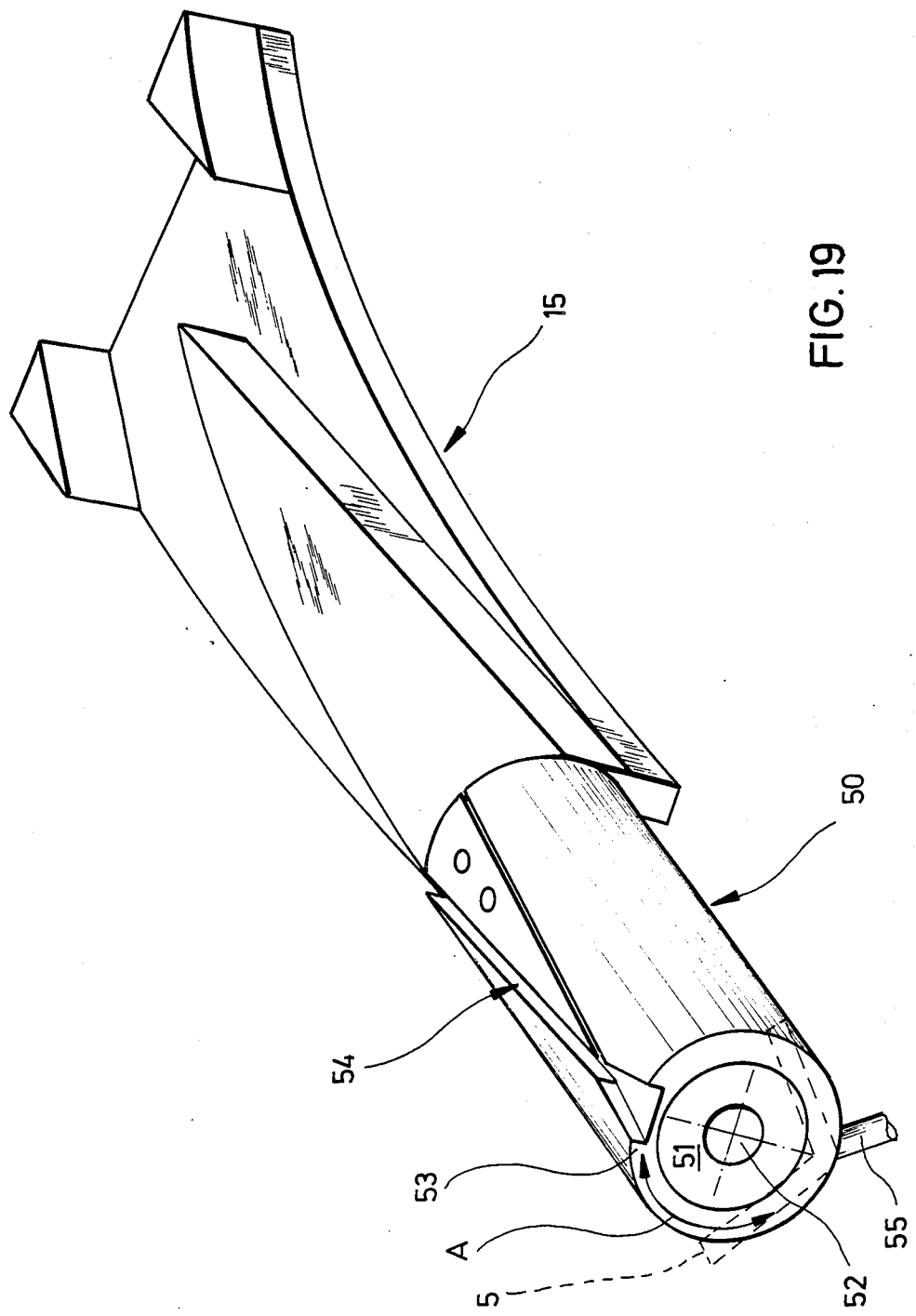
FIG. 19 shows a perspective bottom view of a switch including a second embodiment of changeover means.
Figure 21:
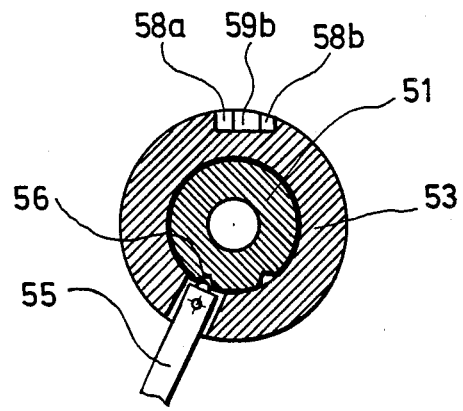
FIG. 21 shows a sectional view taken along the line XXI—XXI in FIG. 20B.
Figure 22:
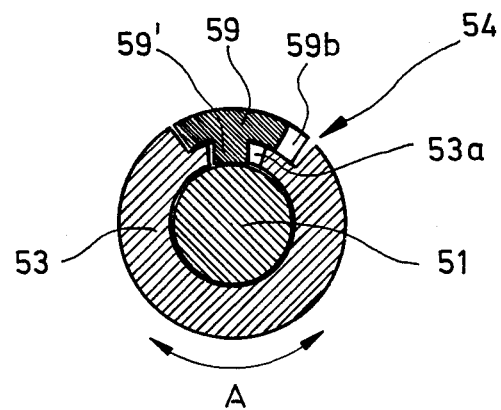
FIG. 22 shows a sectional view taken along the line XXII—XXII in FIG. 20B

Shown in FIG. 19 is another embodiment of a changeover means 50 cooperating with a left branching switch 15 of the type described. For better understanding FIG. 19 shows a perspective bottom view in which the incoming rail 5 for the center-suspended position is only indicated by broken lines. Changeover means 50 comprises a core 51 non-rotatably secured to rail 5 and switch 15 with the aid of respective threaded bores 52. Supported on core 51 is a cylinder sleeve 53 for rotation in opposite directions as indicated by double arrow A. As particularly evident in connection with FIGS. 20 to 22, cylinder sleeve 53 has its side facing away from the travelling surfaces formed with a guide groove 54 and carries a detent plug 55 on its top. Detent plug 55 (FIG. 21) is provided in the conventional manner with a spring-biased detent ball adapted to drop into respective recesses 56 in the surface of core 51 for locking cylinder sleeve 53 in respective operative positions on core 51. Guide groove 54 is formed by the following construction: Cylinder sleeve 53 is formed with a recess 57 the walls of which are arranged in the shape of an isosceles triangle having its base facing towards switch 15. Recess 57 is shorter than the axial length of cylinder sleeve 53, an entry groove 58 being provided to extend from recess 57 to the end of cylinder sleeve 53. Entry groove 58 has the shape of an isosceles triangle with its sidewalls 58a, 58b converging towards recess 57 and enclosing the same angle with a center line through recess 57 and entry groove 58 as do the sidewalls 57a, 57b of recess 57. Fixedly secured to non-rotatable core 51 is a likewise non-rotatable deflector 59. As particularly shown in FIG. 22, deflector 59 has a leg portion 59' extending through an opening 53a of cylinder sleeve 53 and threadedly secured to core 51. Leg portion 59' and opening 53a are preferably of an elongate oval shape, the width of opening 53a in the peripheral direction of cylinder sleeve 53 being somewhat greater than that of leg portion 59' so as to permit cylinder sleeve 53 to be freely rotated in the directions of arrow A about a predetermined angle.

Deflector 59 has side faces 59a and 59b likewise arranged in the shape of an isosceles triangle of a geometric configuration similar to that of triangular recess 57. Deflector 59 has its apex extending to a point adjacent the inner end of entry groove 58, its width being smaller than that of recess 57 by the width of guide groove 54.

As evident from comparison of FIGS. 20a and 20b, changeover means 50 is switched from one operative position to the other in the following manner: By manually gripping detent plug 55 in the position shown in FIG. 20a, cylinder sleeve 53 is rotated relative to core 51 until side face 57a of recess 57 abuts side face 59a of deflector 59, this rotation being permitted by the disengagement of the detent ball from the respective detent 56. This rotation causes a guide groove 54 pointing in the selected direction to be opened between side face 59b of deflector 59 and side face 57b of recess 57.

Figure 20A:
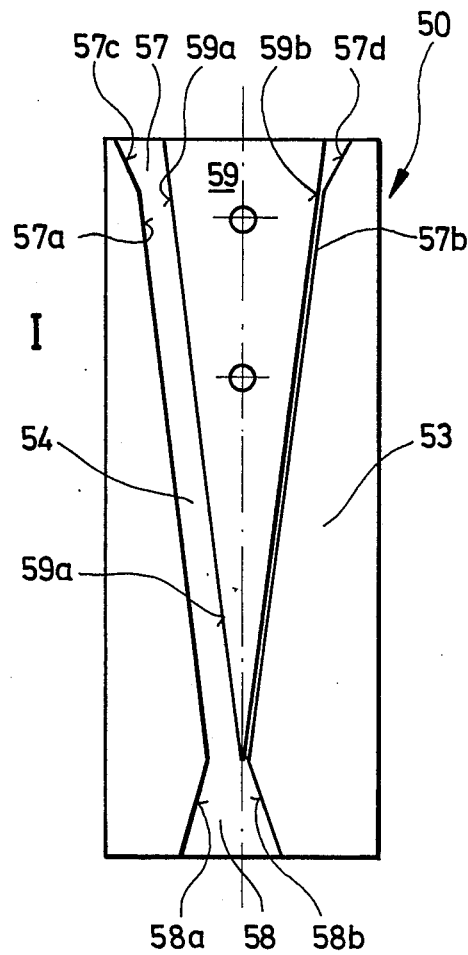
FIGS. 20A and 20B show top plan views of the changeover means of FIG. 19 in two operative positions I and II.
Figure 20B:
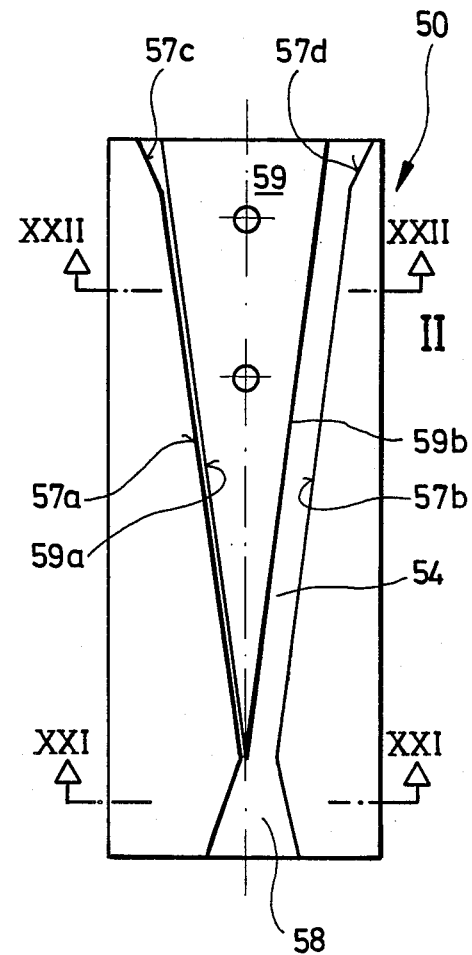

By the geometrically similar shape of triangular recess 57, deflector 59 and entry groove 58 it is ensured that in the operative position I shown in FIG. 20a side face 58a of entry groove 58 extends in alignment with side face 59a of deflector 59 to thus establish a continuous guide groove 54. In the operative position II shown in FIG. 20b, side face 58a of entry groove 58 extends in alignment with side face 59b of deflector 59 to thereby form a continuous guide groove 54 also in this position.

Figure 23:
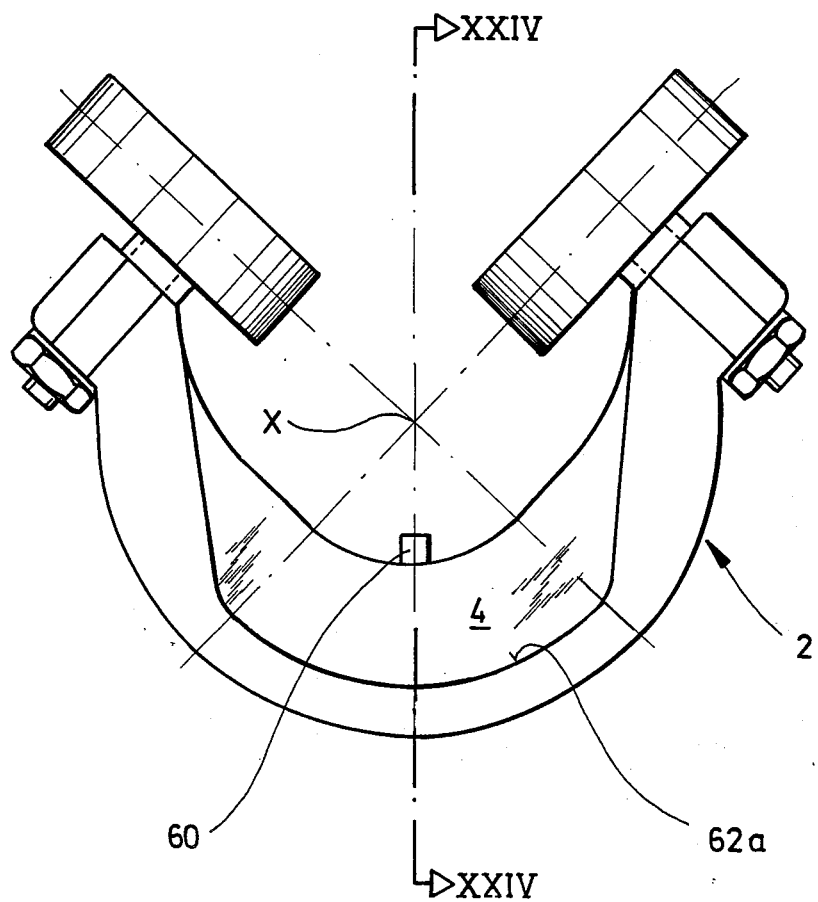
FIG. 23 shows a front view of a conveyance unit for use with a changeover means according to FIGS. 19–22.

Guide groove 54 has the purpose of guiding therein a guide pin 60 of a conveyance unit 2 shown in FIG. 23. As shown in this figure, guide pin 60 is positioned on the inner side of yoke 4 accurately on the symmetry axis of conveyance unit 2 and projects over the surface of yoke 4 to a level ensuring its engagement with guide groove 54 of changeover means 50.

Guide pin 60 may have a circular or an elongate oval cross-section, with the longer axis extending perpendicular to the plane of the drawing in the latter case. The oval cross-sectional shape is effective to facilitate entry of guide pin 60 into guide groove 60 and its passage therethrough. For reducing frictional drag guide pin 60 may be rotatably mounted in yoke 4 or provided with a rotatable envelope.

With a view to further reduce friction and running noises, the following material combinations have been found particularly suitable: A cylinder sleeve 53 of polyamide cooperating with a steel guide pin 60, or a cylinder sleeve 53 made of aluminum or another metal cooperating with a polyamide guide pin or a polyamide lining of pin 60. Other sysnthetics such as polytetrafluor ethylene and/or other material combinations may also be found suitable.

Figure 24:
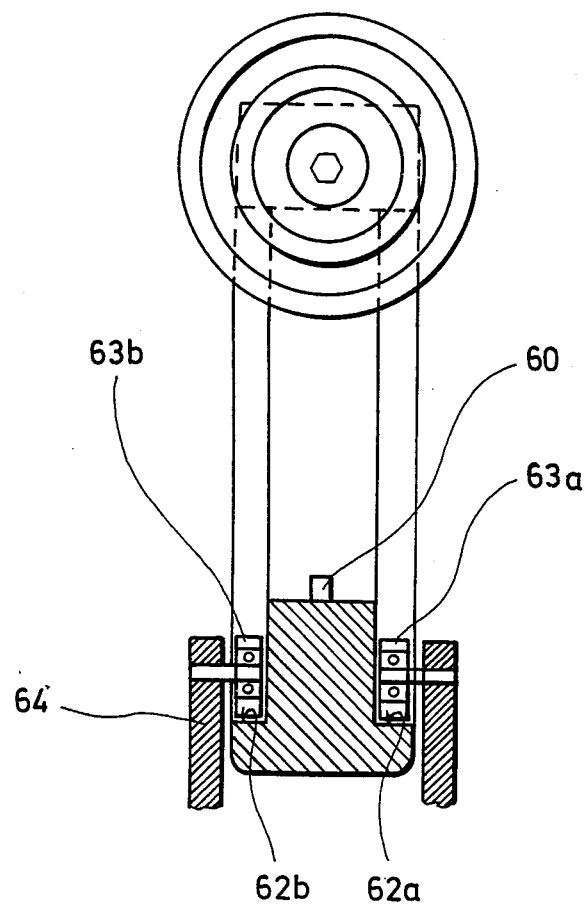
FIG. 24 shows a sectional view taken along the line XXIV—XXIV in FIG. 23, FIGS. 25A and 25B show a further embodiment of a changeover means.

The conveyance unit 2 shown in FIG. 23 differs from the one descriebd before by another particular: the guide slots 25a and 25b are here replaced by respective running surfaces 62a and 62b. Running surfaces 62 are centered on the imaginary tilt axis X in the same manner as previously described with reference to guide 25. As shown in FIG. 24, a pair of rollers 63a, 63b is rotatably mounted in a diagrammatically indicated forked member 64 for travelling on respective ones of running surfaces 62a and 62b. The objects to be conveyed are suspended from fork member 64 in the manner already described.

Figures 25A, 25B:
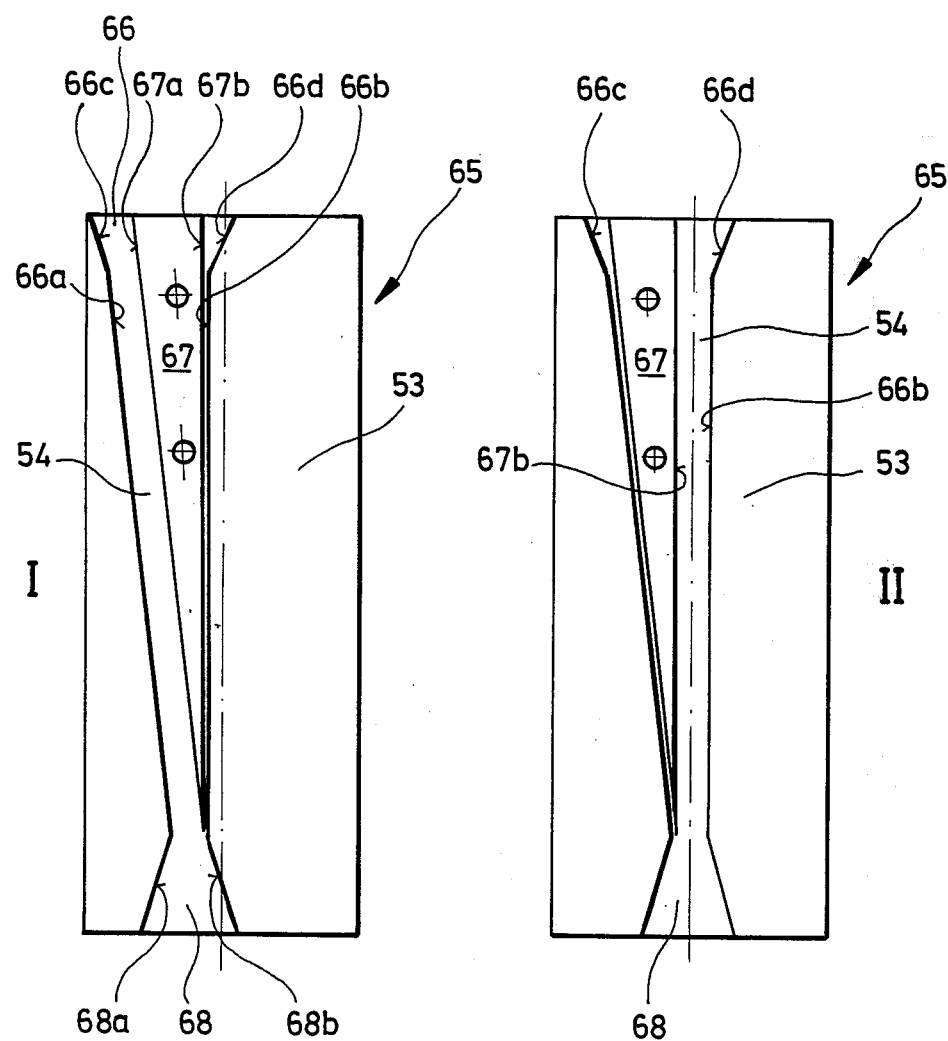

With the exception of certain details, a further embodiment of a changeover means 65 shown in FIGS. 25a and 25b is similar to changeover means 50, the same or corresponding parts having been designated by the same reference numerals. Changeover means 65 is designed for use in a rail circuit requiring only two different positions of the conveyance units. Changeover unit 65 again comprises a cylinder sleeve 53 rotatably mounted on a core in the manner already described. The bottom side of cylinder sleeve 53 is formed with a recess 66 the side faces 66a and 66b of which form a rectangular triangle having one side (face 66b) extending in the direction of travel. The base of the triangle is again facing towards a switch for instance. Non-rotatably connected to the core is a deflector 67 having a geometrical configuration similar to that of recess 66 with side faces 67a and 67b, its width being smaller than that of recess 66 by the width of guide groove 54. Recess 66 and deflector 67 are again shorter than the axial length of cylinder sleeve 53 and have an entry groove 68 extending therefrom. In this case entry groove 68 has the shape of a isosceles triangle having side faces 68a and 68b of which at least side face 68b encloses the same angle with the direction of travel as does side face 67a of deflector 67. Side face 68a may extend axially inwards from the end of cylinder sleeve 53.

In the embodiment shown, changeover means 65 is designed for tilting conveyance unit 2 from the center-suspended position to the right laterally suspended position. When used with rails of a suitable type, for instance rails having a cylindrical running surface, changeover means 65 may additionally be used in its second operative position for allowing the conveyance units to pass on in the center-suspended position.

In the operative position shown in FIG. 25a, side face 66b of recess 66 in cylinder sleeve 53 abuts side face 67b of deflector 67, so that a guide groove 54 has been opened between side faces 66a and 67a. Guide pin 60 of a conveyance unit 2 arriving in the center-suspended position enters entry groove 68 along the indicated center line and comes into engagement with side face 68b to be thereby guided onto side face 67a of deflector 67. As a result, yoke 4 of conveyance unit 2 is tilted to the right laterally suspended position.

When a conveyance unit 2 is intended to pass changeover means 65 in the center-suspended position, cylinder sleeve 53 is rotated to the second operative position in which side face 66a of recess 66 abuts side face 67a of deflector 67 while guide groove 54 is now opened between side faces 66b and 67b. In this position guide groove 54 extends in the longitudinal center plane of changeover means 65, permitting pin 60 to pass therethrough without tilting yoke 4.

Changeover means 65 may also be designed for tilting the conveyance units from the center-suspended position to the left laterally suspended position by reversing the position of recess 66 and deflector 67 with respect to the vertical center plane of changeover means 65.

Figures 26A, 26B:
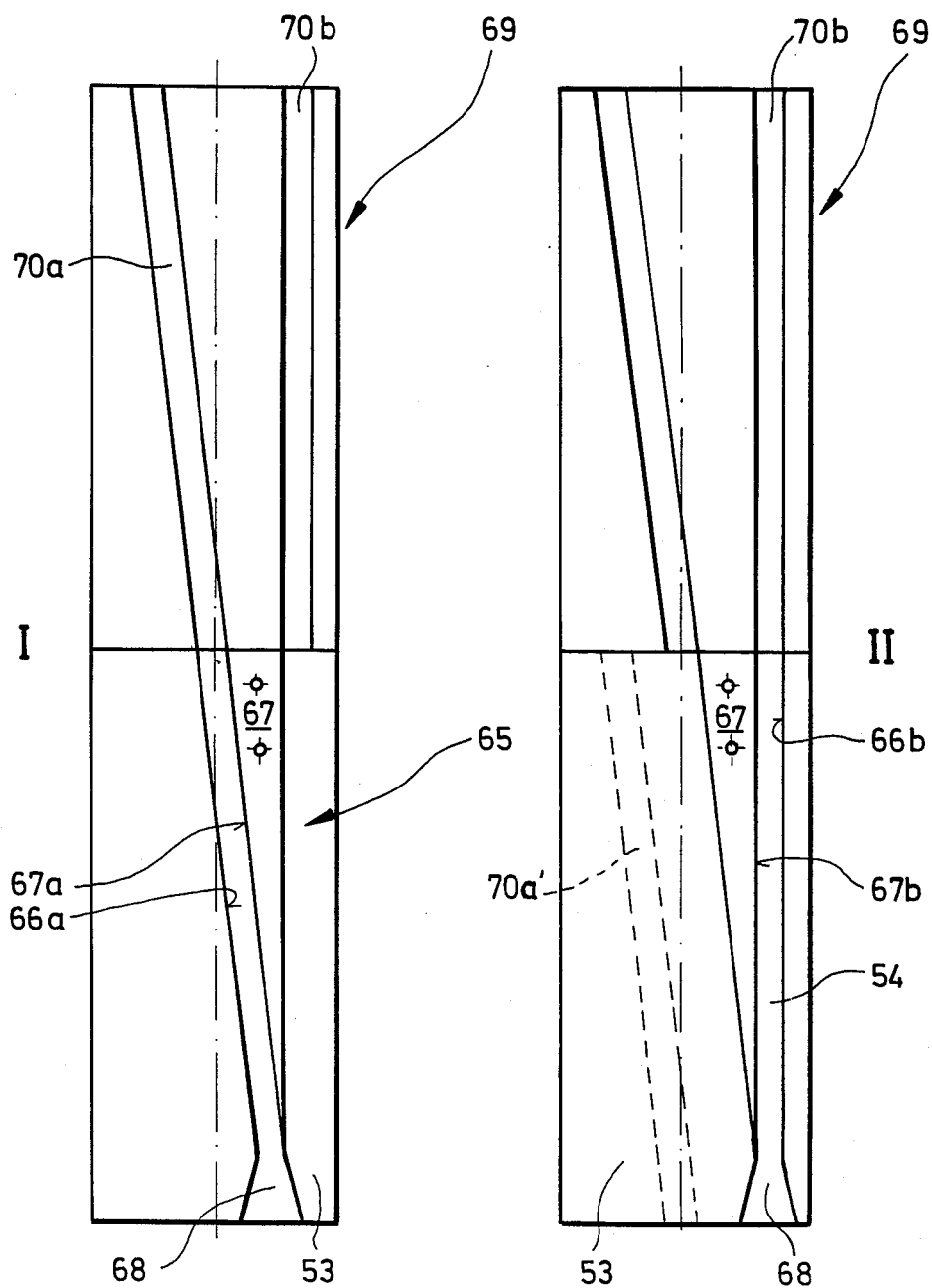
FIGS. 26A and 26B show the changeover means of FIG. 25 with an accessory.

While respective ones of changeover means 9 or 50 may be mounted one behind the other or opposite one another for permitting a changeover from the left laterally suspended position to the right laterally suspended position and vice versa, FIGS. 26a and 26b show an arrangement in which changeover means 65 is combined with an auxiliary guide member 69. This combination permits a conveyance unit to pass in the left or right or left laterally suspended position or to be tilted to the right or left laterally suspended position, respectively. Auxiliary guide member 69 is formed as a cylinder having the same outer diameter as cylinder sleeve 53. It is non-rotatably secured in the selected position for instance to core 51 and/or an adjacent switch and formed with two extension grooves 70a and 70b at fixed locations. Extension groove 70a extends in alignment with the guide groove opening between side faces 66a and 67a, while extension groove 70b is aligned with the guide groove opening between side faces 66b and 67b. In the embodiment shown changeover means 65 is designed for a conveyance unit arriving in the left laterally suspended position. The tilting position is shown in FIG. 26a, in which cylinder sleeve 53 has been rotated to a position in which the guide groove has been opened between side faces 66a and 67a. Guide pin 60 enters entry groove 68 in the left laterally suspended position of the conveyance unit and is displaced downwards along guide groove 54 towards the vertical center plane of changeover means 65 When guide pin 60 has arrived at the vertical center plane, the conveyance unit is in the center-suspended position at the transition from changeover means 65 to auxiliary guide member 69. Extension groove 70a subsequently acts to displace guide pin in the other direction away from the vertical center plane and upwards until the right laterally suspended position is reached at the end of auxiliary guide member 69.

When on the other hand a conveyance unit is intended to pass in the left laterally suspended position, cylinder sleeve 53 is rotated to the second operative position in which guide groove 54 is opened between side faces 66b and 67b to give access to extension groove 70b. Extension groove 70b and the guide groove opening between side faces 66b and 67b extend at the same level and at the same distance from the vertical center plane, so that the conveyance unit is allowed to pass in the position in which it has arrived.

The arrangement shown in FIGS. 26a and 26b may also be designed for use with conveyance units arriving in the right laterally suspended position by reversing the positions of the various grooves with respect to the vertical center plane.

Auxiliary guide member 69 has been shown in FIGS. 26a and 216b as a separately formed part. It is also possible, however, to modify changeover means 65 in such a manner that the function described with reference to FIG. 26 is achieved with two changeover means 65 mounted in series.

To this purpose cylinder sleeve 53 has to be formed with a groove 70a' corresponding to extension groove 70a and having its upstream end spaced from entry groove 68 by a distance corresponding to the displacement of guide pin 60 from a laterally suspended position to the center-suspended position. The additional guide groove to take the place of extension groove 70a would have to have its upstream end in the vertical center plane of changeover means 65 in the position of cylinder sleeve 53 shown in FIG. 26b. The cylinder sleeve 53 of the changeover means 65 to replace auxiliary guide member 69 would also have to be locked in the operative position shown in FIG. 26b in which guide groove 54 is opened between side faces 66b and 67b. The thus opened guide groove is brought into alignment with the guide groove opening between the same two side faces of the switchable upstream changeover means 65, to thereby ensure that the additional groove 70a' of the downstream changeover means 65 extends in alignment with the guide groove opening between side faces 66a and 67a of the adjustable upstream changeover means 65.

As evident already from a comparison of FIGS. 25 and 26, changeover means 65 may specifically mounted in the rail circuit with its deflector at different positions relative to the vertical center plane to meet various requirements. Thus in FIG. 25 entry groove 68 is designed and arranged so as to permit the guide pin of a conveyance unit arriving in the center-suspended position to be guided into guide groove 54 irrespective of the position of cylinder sleeve 53. By contrast the changeover means 65 shown in FIG. 26 is mounted at an offset position permitting the guide pin of a conveyance unit arriving in the left laterally suspended position to enter entry groove 68 in any position of cylinder sleeve 53.

For an application in which conveyance units are to travel on a rail circuit equipped with changeover means 50 and/or 65 also in a second direction opposite to the previously described direction of travel, provisions may be made as in the case of changeover means 9 for permitting a conveyance unit approaching a closed guide groove to open the way all by itself. As shown in FIGS. 20 and 25, this purpose is served by camming surfaces c and d formed as extensions of the side faces of recesses 57 and 66 in cylinder sleeve 53. As shown in FIG. 20, camming faces 57c and 57d of recess 57 extend obliquely outwards to result in a funnel-shaped widening. The width of the resulting opening is preferably so selected that, for instance when side face 57b of recess 57 is in abutment with side face 59b of deflector 59, camming face 57d cooperates with side face 59b of deflector 59 to define a funnel-shaped converging inlet gap the opening of which is as large as or larger than the diameter of guide pin 60. The guide pin 60 of a conveyance unit arriving in the left laterally suspended position in the opposite direction of travel at the changeover means shown in FIG. 20 will thus enter the inlet gap between deflector 59 and camming face 57d to thereby exert a wedge action therebetween for opening a guide groove for itself by rotating cylinder sleeve 53 to force side faces 57b and 59b apart, this rotation being again permitted by the disengagement of the detent plug 55. Similar functions are performed by camming face 57c and by camming faces 66c and 66d in FIG. 25.

Figure 27A:
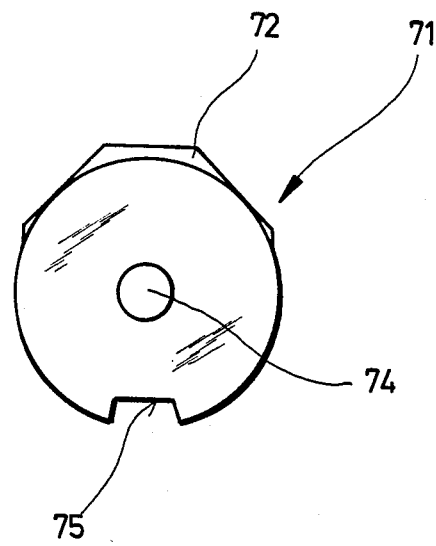
FIGS. 27A and 27B show a front view and a sectional sideview of an adapter.
Figure 27B:
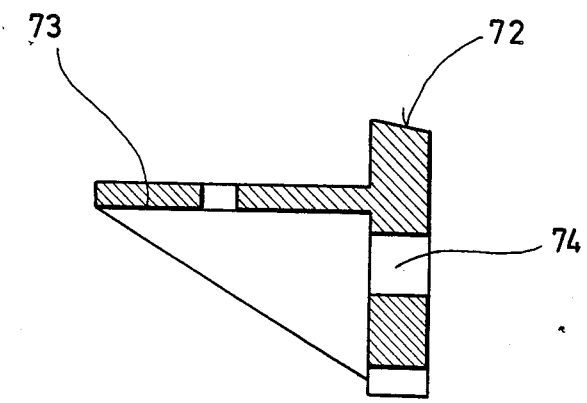

FIGS. 27a and 27b show an adapter 71 provided for still further facilitating the entry of a conveyor unit into a changeover means and its release therefrom as well as for further reducing running noises. In the embodiment shown, adapter 71 comprises a travelling surface 72 forming a transition between a triangular or trapezoidal rail section and the rounded travelling surface of the changeover means. Adapter 71 may for instance be secured to rail 5 with the aid of a lug 73, and to the respective changeover means with the aid of a bolt passing through a bore 74. When intended for use in combination with changeover means 50 or 65, adapter 71 has its bottom portion formed with a groove 75 in alignment with entry groove 68 or 58, respectively.

The invention is not restricted to the embodiments described and depicted in the drawings, it being possible in particular to exchange any details shown in the various figures among each other. The construction of the rails and switches or branch junctions may thus be as described with reference to the first embodiment. Any predetermined and constant change of the suspension position on each passage may be achieved by the use of positive guide elements locked in position as in the first embodiment, or by using positive guide elements of an inherently rigid construction. In this case the positive guide elements preferably comprise constantly open guide grooves extending in the desired direction, as in the case of the described auxiliary guide member.

It is also not necessarily required to provide an entry groove, it being also possible for respective recesses and deflectors to extend to the end of the cylinder sleeve as long as it is ensured that the guide pin encounters the respective open guide groove in any position of the cylinder sleeve. Likewise, the detent means may be designed to comprise a pawl.

The structural components employed for the suspension conveyor system according to the invention are particularly suited for a conveyor path extending at different levels at different angles of inclination up to about 30°. This results in improved versatility of the system. Between a changeover means for instance and a switch disposed at an inclined position there may be provided, if need be, a connecting member for smoothly guiding conveyance units arriving horizontally in a laterally suspended position onto the inclined track. A connecting member of this kind will suitably be made of a synthetic material permitting the required smooth transition between a horizontal path and an inclined path to be achieved in a simple manner.

The selection of the rail material is dictated by the given requirements. As evident particularly from FIG. 16, it is possible to solely use rails for the two laterally suspended positions in the construction of the conveyor system. The storage of supplies and spares is moreover greatly facilitated by designing the rails with the above described cross-sectional shape.

The changeover means does not necessarily have to be installed directly in the rail circuit, it being rather also possible, if desired, to install the changeover means apart from the rail circuit so as to act on the outer side of the yoke for instance through adjustable guide tracks.

The conveyance unit may moreover be likewise provided with a different construction of a sliding or roller guide arrangement for an element for the suspension of the objects to be conveyed, for instance in the form of a single slot extending completely through the yoke, or of a T-guide member disposed at the bottom side of the yoke. The guides provided on the switches for the non-weight-carrying roller may for instance have only a single track surface or a support surface to be engaged by the top surface of the roller. Also the tracks or travelling surfaces within the switches or on the rails for the laterally suspended positions may be of a linear construction having a semicircular cross-sectional shape.

We claim:

1. A suspension conveyor system for conveying objects along a rail path comprising a conveyance unit having a first and a second travelling roller connected to one another by an open yoke extending partially around said rail path, said conveyance unit being constructed to travel in at least two of a first, a second, and a third suspension position, in said first suspension position said first travelling roller engaging a travelling surface of said rail path while carrying the weight of the objects to be conveyed, in said second suspension position said second travelling roller engaging a travelling surface of said rail path while carrying the weight of the objects to be conveyed, and in said third suspension position the first and the second travelling rollers engaging a travelling surface of said rail path while together carrying the weight of the objects to be conveyed, said conveyor system further comprising changeover means including a positive guide element adapted to be adjusted to a first and a second operative position, said positive guide element being consructed and positioned to be engaged by said conveyance unit during its travel along said rail path, said conveyance unit being in one of said suspension positions after passing said guide element in said first operative position, and said conveyance unit being in another of said suspension positions different from said one suspension position after passing said guide element in said second operative position, when travelling in at least a first direction of travel.

2. A suspension conveyor system according to claim 1, characterized in that said changeover means is disposed adjacent a junction whereat a single rail branches into at least two rails, and that there is provided guide means extending from said changeover means to a location beyond said junction engaging and guiding said conveyance unit in said first or said second suspension position.

3. A suspension conveyor system according to claim 2, characterized in that said junction is located on a switch, said switch being formed as an integral shaped member comprising respective travelling surfaces diverging with respect to each other and secured at fixed positions relative to one another at said junction.

4. A suspension conveyor system according to claim 3, characterized in that adjacent said switch said travelling surfaces are substantially horizontal for said conveyance unit to travel thereover in said first or said second suspension position.

5. A suspension conveyor system according to claim 2, characterized in that the travelling surface of the rail extending between said changeover means and said junction is integrally connected to the travelling surfaces of the rails extending from said junction away from said changeover means.

6. A suspension conveyor system according to claim 2, characterized in that said guide means comprises guide surfaces disposed respectively at opposed lateral side of said junction, each of said guide surfaces being positioned to be engaged by an associated engagement surface of said yoke in said first and second suspension position thereof, respectively.

7. A suspension conveyor system according to claim 2, characterized in that said guide means comprises guide surfaces, formed on a wall portion each acting as a lateral boundary of said travelling surfaces and cooperating with an associated engagement surface on said first and said second travelling roller, respectively.

8. A suspension conveyor system according to claim 3, characterized in that said switch is provided with detachment locations for removing said conveyance unit in its first or second suspension position, at which locations the thickness of said switch is smaller than the clearance between said travelling rollers.

9. A suspension conveyor system according to claim 2, characterized in that second changeover means is provided in said downstream travelling surface.

10. A suspension conveyor system according to claim 1, characterized in that said rail path comprises rails of at least two of the following types: a rail with a bisected travelling surface for said third suspension position of said conveyance unit, a rail with at least one travelling surface for said first travelling roller in said first suspension position of said conveyance unit, and a rail with at least one travelling surface for said second travelling roller in said second suspension position of said conveyance unit.

11. A suspension conveyor system according to claim 10, characterized in that said rail path includes rails for the first, second and third suspension positions.

12. A suspension conveyor system according to claim 11, characterized in that said rail for said third suspension position includes two traveling surfaces cooperating with respective ones of said traveling rollers said traveling surfaces are inclined downwardly at an angle of about 45° with respect to the vertical, while said traveling surfaces of said rails for said first and second suspension positions are substantially horizontal.

13. A suspension conveyor system according to claim 11, characterized in that said positive guide element is arranged in such a manner that a conveyance unit arriving at said changeover means in the third suspension position is tilted to said first suspension position in said first operative position, and to said second suspension position in said second operative position.

14. A suspension conveyor system according to claim 1, characterized in that said changeover means is disposed in said rail circuit and includes a positive guide element arranged within a traveling path of at least one traveling roller.

15. A suspension conveyor system according to claim 14, characterized in that said positive guide element of said changeover means comprises further first and second guide surfaces mounted for pivotal displacement about a substantially vertical pivot axis.

16. A suspension conveyor system according to claim 15, characterized in that in said first operative position said further second guide surface acts as a stop for said second travelling roller when arriving in said third suspension position said further second guide surface causing said conveyance unit to be moved out of said third suspension position by tilting said yoke, while said further first guide surface acts as a stop for said first travelling roller as said yoke is tilted to the first suspension position, and in said second operative position said further first guide surface acts as a stop for said first travelling roller arriving in the third suspension position, said further first guide surface causing said conveyance unit to be moved out of said third position by tilting said yoke, while said further second guide surface acts as a stop for said second travelling roller as said yoke is tilted to the second suspension position.

17. A suspension conveyor system according to claim 15, characterized in that during the transition from the second suspension position to the third suspension position in said second operative position, said further second guide surface acts as a stop for said second travelling roller arriving in the second suspension position, whilst said further first guide surface acts as a stop for said first travelling roller as said yoke is being tilted, and during the transition from said first suspension position to said third suspension position in said first operative position said further first guide surface acts as a stop for said first travelling roller arriving in the first suspension position, whilst said further second guide surface acts as a stop for said second travelling roller as said yoke is being tilted.

18. A suspension conveyor system according to claim 15, characterized in that the distance between said further first and second guide surfaces increases in the direction away from said pivot axis.

19. A suspension conveyor system according to claim 15, characterized in that said further first and second guide surfaces are formed as stop surfaces.

20. A suspension conveyor system according to claim 14, characterized in that adjacent said positive guide element said travelling surface is formed as a part of a circumferential surface of a cylinder the axis of which extends parallel to the direction of travel of said conveyance unit.

21. A suspension conveyor system according to claim 20, characterized in that said cylinder is mounted within said rail path rotatably about said axis.

22. A suspension conveyor system according to claim 14, characterized in that there is provided an actuating lever for said positive guide element having first and second control edges for cooperation respectively with a further first and a further second control edge on said yoke, the engagement of said control edges of said positive guide element with said further control edges of said actuating lever being effective to pivot said actuating lever, and thereby said positive guide element to the first or second operative position as required for passing said changeover means.

23. A suspension conveyor system according to claim 22, characterized in that said actuating lever is rotatable about a fixed axis extending parallel to said pivot axis of said positive guide element, said actuating lever comprising a pin, and said pin slidably engaging a spring-biased rotary slide bearing having a first and a second detent position in which said positive guide element is pivoted to its first and second operative position respectively.

24. A suspension conveyor system according to claim 22, characterized in that said further first and second control edges of said actuating lever are each formed on a fork-shaped extension of said actuating lever.

25. A suspension conveyor system according to claim 1, characterized in that said changeover means is disposed in said rail circuit and comprises a positive guide element for a guide pin carried by said yoke.

26. A suspension conveyor system according to claim 25, characterized in that said positive guide element comprises a guide groove causing said conveyance unit at least in one of said operating positions to change said suspension position by tilting said yoke.

27. A suspension conveyor system according to claim 26, characterized in that said guide groove is formed in a cylinder mounted for rotation in the tilting direction of said yoke.

28. A suspension conveyor system according to claim 27, characterized in that said cylinder is formed with a recess having a width increasing from an apex in a first direction of travel of said conveyance unit, a deflector being non-rotatably mounted interiorly of said recess, side surfaces of said deflector and said recess forming geometrically similar triangles with a width reduced by at least the width of said guide groove, so that rotation of said cylinder to the first operative position causes a guide groove to be opened between parallel side surfaces of one side of said recess and said deflector, while closing a guide groove between parallel side surfaces of the other side of said recess and said deflector and rotation of said cylinder to the second operative position causes a guide groove to be opened between parallel side surfaces of the other side of said recess and said deflector while closing a guide groove between parallel side surfaces of said one side of said recess and said deflector.

29. A suspension conveyor system according to claim 27, characterized in that said cylinder is formed as a cylinder sleeve mounted for rotation on a core fixedly mounted adjacent said rail circuit.

30. A suspension conveyor system according to claim 28, characterized in that said deflector is fixedly connected to a core which is fixedly mounted adjacent said rail path, said cylinder being formed as a cylinder sleeve mounted for rotation on said core.

31. A suspension conveyor system according to claim 30, characterized in that said deflector comprises a leg portion extending through an opening in said cylinder sleeve of a greater width than said leg portion and connected to said core.

32. A suspension conveyor system according to claim 31, characterized in that said opening and said leg portion are of an elongate oval shape.

33. A suspension conveyor system according to claim 27, characterized in that detent means is provided for releasably locking said cylinder in each operative position.

34. A suspension conveyor system according to claim 28, characterized in that said recess is shorter than said cylinder said apex of said recess being extended by an entry groove.

35. A suspension conveyor system according to claim 28, characterized in that side surfaces of said recess and said deflector form similar isosceles triangles and are aligned so that the lateral sides of said triangles extend obliquely with respect to the direction of travel.

36. A suspension conveyor system according to claim 34, characterized in that side surfaces of said entry groove form an isosceles triangle converging in the direction towards the centerline of said recess, so that in each operative position a respective side surface of said entry groove is aligned with the corresponding side surface of said deflector defining said guide groove.

37. A suspension conveyor system according to claim 28, characterized in that said side surfaces of said recess and said deflector form similar right triangles one of the rectangle side surfaces of which extends in the direction of travel, so that in one of the operative positions after passing said positive guide element said conveyance unit being still in its incoming suspension position, while in the other operative position after passing said positive guide element said conveyance unit being in a suspension position different from said incoming suspension position.

38. A suspension conveyor system according to claim 34, characterized in that side surfaces of said entry groove form an isosceles triangle converging in the direction towards said recess, one of said side surfaces of said entry groove being aligned with a non-rectangular side surface of said deflector.

39. A suspension conveyor system according to claim 1, characterized in that two changeover means are disposed in a mirror image-wise sequence for tilting said yoke from said first suspension position to said second suspension position or vice versa, a first changeover means being effective to tilt said yoke from said first or said second suspension position to said third suspension position, and the second changeover means being effective to tilt said yoke from said third suspension position to said second or said first suspension position.

40. A suspension conveyor system according to claim 37, characterized in that for tilting said yoke from said first suspension position to said second suspension position or vice versa there is provided an auxiliary guide member downstream of said changeover means, said auxiliary guide member being formed with two extension grooves forming respective extensions of said guide grooves opening in said changeover means.

41. A suspension conveyor system according to claim 40, characterized in that said auxiliary guide is similar to said changeover means but having its cylinder non-rotatably mounted at a fixed position and being provided with an additional rigid extension groove forming an extension of the guide groove opening between the angular side surfaces of said changeover means.

42. A suspension conveyor system according to claim 41, characterized in that said auxiliary guide member and said changeover means are of identical construction.

43. A suspension conveyor system according to claim 27, characterized in that said guide pin is disposed on said yoke at an intermediate position between said travelling rollers and that said guide groove is located on the side of said cylinder facing away from said travelling surfaces.

44. A suspension conveyor system according to claim 25 characterized in that said guide pin (60) is of circular cross-sectional shape.

45. A suspension conveyor system according to claim 26, characterized in that said guide groove is provided with guide surfaces made of plastic, and that said guide pin is made of steel.

46. A suspension conveyor system according to claim 26, characterized in that is provided with guide surfaces made of metal or a metal alloy, said guide pin being provided with a plastic surface.

47. A suspension conveyor system according to claim 1, characterized in that further guide means is provided for maintaining said yoke in the first or second suspension position after passing said positive guide element.

48. A suspension conveyor system according to claim 47, characterized in that said further guide means includes engagement surfaces on said conveyance unit and said rail adapted to engage one another in said first or second suspension position.

49. A suspension conveyor system according to claim 47, characterized in that said further guide means further comprises engagement surfaces on said rail and said travelling roller carrying the weight of the object to be conveyed, said engagement surfaces being adapted to be engaged respectively in said first or second suspension position.

50. A suspension conveyor system according to claim 47, characterized in that one additional guide surface is provided for said second travelling roller in said first suspension position, and another additional guide surface is provided for said first travelling roller in said first suspension position.

51. A suspension conveyor system according to claim 1, characterized in that between said changeover means and a rail for said third suspension position there is provided an adapter comprising a transition travelling surface.

52. A suspension conveyor system according to claim 1, characterized in that it comprises at least one additional switch.

53. A suspension conveyor system according to claim 52, characterized in that said additional switch forms a three-way switch in cooperation with a switch formed as an integral shaped member.

54. A suspension conveyor system according to claim 53, characterized in that said additional switch comprises a rail section having a travelling surface for a laterally suspended position and adapted to be displaced towards said switch disposed in said rail circuit, a wall of said switch facing towards said rail section being formed with a gap adapted to be opened and closed by a closure member.

55. A suspension conveyor system according to claim 54, characterized in that said closure member is formed as a pivotable tongue.

56. A suspension conveyor system according to claim 1, characterized in that said conveyance unit comprises a suspension guide for a suspension apparatus adapted to carry the object to be conveyed, said conveyance unit being mounted to be tilted over a tilt angle about an imaginary tilt axis for changing said suspension position, said guide extending at least over said tilt angle between said positions of said yoke and being effective on tilting of said yoke to automatically guide said suspension apparatus therein by the action of the weight of the object to be conveyed.

57. A suspension conveyor system according to claim 56, characterized in that said suspension guide extends along an arc about an axis extending coaxial with the imaginary tilt axis of said yoke.

58. A suspension conveyor system according to claim 57, characterized in that said suspension guide is formed as a slot for the engagement of a suspension bracket.

59. A suspension conveyor system according to claim 57, characterized in that said yoke has two sides essentially rectangular to said imaginary tilt axis, each of said two sides are formed with a running surface for a respective roller to travel thereon.

60. A suspension conveyor system according to claim 28, characterized in that a downstream end of said guide groove in said first direction of travel of said conveyance unit is formed with a control surface in alignment with the side surface of said recess, said control surface extending obliquely with respect to the direction of travel of said conveyance units and cooperating with the adjacent side surface of said deflector, when said guide groove is closed to form an inlet passage to be entered by said guide pin when approaching in a second direction of travel opposed to said first direction to thereby rotate said cylinder sleeve for opening said guide groove.

61. A suspension conveyor system according to claim 1 characterized in that said rail circuit includes a rigid positive guide element effective to tilt the yoke arriving thereat to a predetermined suspended position.

62. Conveyance unit for traveling along a rail of a suspension conveyor system comprising a first and a second travelling roller connected to one another by an open yoke, and a suspension apparatus for objects to be conveyed connected to said yoke for travelling therewith, said objects being in a hanging position with their centers of mass below said rail, means mounting said yoke to said suspension apparatus for tilting and rotational movement relative thereto and about an axis substantially parallel to said rail, said suspension apparatus being supported by said mounting means so as to maintain said hanging position of said object during tilting and rotation of said yoke.

63. A conveyance unit according to claim 62, characterized in that said suspension guide means extends substantially along a portion of an arcuate path.

64. A conveyance unit according to claim 62 characterized in that said suspension guide means is a sliding guide.

65. A conveyance unit according to claim 62, characterized in that said suspension apparatus comprises at least one pin slidable guided in at least one slot in said yoke.

66. A conveyance unit according to claim 62 characterized in that said yoke comprises two sides essentially perpendicular to said axis, each of said two sides being formed with a running surface each for at least one running roller of a roller suspension.

* * * * *